United States Patent
Gonzalez et al.

(10) Patent No.: US 11,537,283 B2
(45) Date of Patent: Dec. 27, 2022

(54) CONFIGURING COMPONENTS IN A DISPLAY TEMPLATE BASED ON A USER INTERFACE TYPE

(71) Applicant: salesforce.com, inc., San Francisco, CA (US)

(72) Inventors: Michael Gonzalez, Danville, CA (US); Adheip Varadarajan, Daly City, CA (US); Wenqing Dai, Richmond, CA (US)

(73) Assignee: Salesforce, Inc., San Francisco, CO (US)

( * ) Notice: Subject to any disclaimer, the term of this patent is extended or adjusted under 35 U.S.C. 154(b) by 0 days.

(21) Appl. No.: 17/131,966

(22) Filed: Dec. 23, 2020

(65) Prior Publication Data

US 2021/0181934 A1    Jun. 17, 2021

Related U.S. Application Data

(63) Continuation of application No. 16/138,943, filed on Sep. 21, 2018, now Pat. No. 10,901,593.

(51) Int. Cl.
*G06F 17/10* (2006.01)
*G06F 3/04847* (2022.01)
(Continued)

(52) U.S. Cl.
CPC ........ *G06F 3/04847* (2013.01); *G06F 3/0482* (2013.01); *G06F 3/0486* (2013.01);
(Continued)

(58) Field of Classification Search
CPC .. G06F 3/04847; G06F 3/0482; G06F 3/0486; G06F 9/451; G06F 40/186; G06F 40/197; G06F 40/106
See application file for complete search history.

(56) References Cited

U.S. PATENT DOCUMENTS 6,574,635 B2 * 6/2003 Stauber ................... G06F 9/465
                                                              707/999.001
6,973,460 B1 * 12/2005 Mitra ......................... G06F 8/10
(Continued)

FOREIGN PATENT DOCUMENTS

EP         1103899 A2 *  5/2001   ............ G06F 17/211
EP         1923798 A1 *  5/2008   ......... G06F 16/9577
WO   WO-2011128501 A1 * 10/2011  ......... G06F 9/44505

*Primary Examiner* — Shahid K Khan
(74) *Attorney, Agent, or Firm* — Holland & Hart LLP

(57) ABSTRACT

Methods, systems, and devices for configuring components in a display template based on a user interface type are described. A template customization application may support configuration of a display template corresponding to multiple user interface types. A user may customize the display template by adding a component to the display template (e.g., where the display template is displayed by the template customization application according to a specific user interface type view). The template customization application may determine whether the added component supports rendering for the current user interface type and may display the component in the template based on the determination (e.g., either as a functional component or as a placeholder). Each user interface type supported by the template may be defined in a single underlying metadata file, so adding the component into one view will automatically add the component for all of the supported the user interface types.

20 Claims, 11 Drawing Sheets

(51) Int. Cl.
*G06F 3/0482* (2013.01)
*G06F 3/0486* (2013.01)
*G06F 9/451* (2018.01)
*G06F 40/106* (2020.01)
*G06F 40/186* (2020.01)
*G06F 40/197* (2020.01)

(52) U.S. Cl.
CPC ............ *G06F 9/451* (2018.02); *G06F 40/106* (2020.01); *G06F 40/186* (2020.01); *G06F 40/197* (2020.01)

(56) References Cited

U.S. PATENT DOCUMENTS

| | | | | |
|---|---|---|---|---|
| 7,007,280 B1* | 2/2006 | Dermer | G06F 8/36 | 719/315 |
| 7,287,218 B1* | 10/2007 | Knotz | G06Q 10/10 | 715/209 |
| 7,634,721 B1* | 12/2009 | Labrecque | G06F 8/38 | 715/234 |
| 7,827,527 B1* | 11/2010 | Chiluvuri | G06F 8/36 | 717/109 |
| 7,917,888 B2* | 3/2011 | Chong | G06F 8/20 | 717/102 |
| 8,127,237 B2* | 2/2012 | Beringer | G06F 3/0481 | 710/100 |
| 8,543,641 B2* | 9/2013 | Cherukuri | G06Q 10/10 | 709/203 |
| 8,645,848 B2* | 2/2014 | Lesh | G06F 3/0482 | 715/810 |
| 8,806,357 B2* | 8/2014 | Demant | G06Q 10/10 | 715/765 |
| 9,147,004 B2* | 9/2015 | Coursol | G06F 16/958 | |
| 9,507,480 B1* | 11/2016 | Hui | G06F 3/0486 | |
| 9,525,600 B1* | 12/2016 | Shen | H04L 41/0233 | |
| 10,372,811 B2* | 8/2019 | Rashid | G06F 40/186 | |
| 10,445,113 B2* | 10/2019 | Perry | G06F 9/5044 | |
| 10,514,896 B2* | 12/2019 | Varadarajan | G06F 8/34 | |
| 2002/0140731 A1* | 10/2002 | Subramaniam | G06F 3/0481 | 715/762 |
| 2003/0004971 A1* | 1/2003 | Gong | G06Q 10/087 | |
| 2003/0020746 A1* | 1/2003 | Chen | G06F 16/972 | 715/741 |
| 2003/0070061 A1* | 4/2003 | Wong | G06F 8/38 | 707/999.009 |
| 2003/0090519 A1* | 5/2003 | Subramanian | G06F 9/451 | 715/762 |
| 2003/0172354 A1* | 9/2003 | Martinez Ponce | G06Q 10/10 | 715/249 |
| 2004/0123238 A1* | 6/2004 | Hefetz | G06F 9/451 | 715/234 |
| 2004/0215700 A1* | 10/2004 | Shenfield | H04L 69/329 | 709/201 |
| 2005/0114435 A1* | 5/2005 | DiPlacido | H04L 69/329 | 709/201 |
| 2006/0085744 A1* | 4/2006 | Hays | G06F 40/177 | 715/764 |
| 2006/0176403 A1* | 8/2006 | Gritton | G06F 3/0482 | 348/581 |
| 2007/0077665 A1* | 4/2007 | Bump | G06F 3/0484 | 438/14 |
| 2007/0079236 A1* | 4/2007 | Schrier | G06F 40/114 | 715/209 |
| 2007/0226617 A1* | 9/2007 | Traub | H04L 67/75 | 340/572.1 |
| 2007/0277109 A1* | 11/2007 | Chen | G06F 8/20 | 715/733 |
| 2008/0071883 A1* | 3/2008 | Alterman | G06F 9/451 | 709/217 |
| 2008/0127217 A1* | 5/2008 | Wang | G06F 9/542 | 719/318 |
| 2008/0304662 A1* | 12/2008 | Strobl | H04L 9/0841 | 380/44 |
| 2008/0307385 A1* | 12/2008 | Dreiling | G06F 3/0481 | 717/108 |
| 2009/0043798 A1* | 2/2009 | Tan | G06F 11/1446 | 707/999.102 |
| 2009/0100407 A1* | 4/2009 | Bouillet | G06F 8/34 | 717/105 |
| 2009/0282403 A1* | 11/2009 | Poole | H04L 67/34 | 717/178 |
| 2010/0017812 A1* | 1/2010 | Nigam | G06F 8/38 | 719/328 |
| 2010/0031171 A1* | 2/2010 | Zhang | G06F 8/38 | 715/762 |
| 2010/0050130 A1* | 2/2010 | Farn | G06F 8/38 | 715/853 |
| 2010/0077212 A1* | 3/2010 | McReynolds | G06F 21/10 | 380/278 |
| 2010/0115434 A1* | 5/2010 | Yagi | G06F 8/38 | 715/810 |
| 2010/0241507 A1* | 9/2010 | Quinn | G06Q 30/0256 | 705/14.42 |
| 2011/0113319 A1* | 5/2011 | Saft | G06F 16/93 | 715/223 |
| 2011/0145782 A1* | 6/2011 | Brukner | G06F 8/74 | 717/106 |
| 2011/0225525 A1* | 9/2011 | Chasman | G06F 3/0486 | 715/764 |
| 2012/0102024 A1* | 4/2012 | Campbell | G06F 16/958 | 707/E17.107 |
| 2012/0124480 A1* | 5/2012 | Cherdron | G06Q 10/10 | 715/744 |
| 2012/0137227 A1* | 5/2012 | Gerken, III | G06F 8/38 | 715/747 |
| 2012/0159430 A1* | 6/2012 | Waldbaum | G06F 9/454 | 717/106 |
| 2012/0173567 A1* | 7/2012 | Zavatone | G06F 16/907 | 707/769 |
| 2012/0177187 A1* | 7/2012 | Casalaina | H04M 7/009 | 379/90.01 |
| 2012/0198374 A1* | 8/2012 | Zhang | G06F 3/0486 | 715/769 |
| 2013/0145257 A1* | 6/2013 | Shalabi | G06F 40/106 | 715/243 |
| 2013/0198156 A1* | 8/2013 | Penikis | G06F 16/44 | 715/764 |
| 2013/0232463 A1* | 9/2013 | Nagaraja | G06F 3/0482 | 717/101 |
| 2013/0254758 A1* | 9/2013 | Walter | G06F 8/61 | 717/174 |
| 2013/0265592 A1* | 10/2013 | Bellagamba | G06Q 30/0276 | 358/1.6 |
| 2014/0035945 A1* | 2/2014 | Anglin | G06F 3/14 | 345/619 |
| 2014/0165001 A1* | 6/2014 | Shapiro | G06F 16/54 | 715/811 |
| 2014/0173553 A1* | 6/2014 | Toens | G06F 8/30 | 717/106 |
| 2014/0245288 A1* | 8/2014 | Kim | G06F 8/20 | 717/176 |
| 2014/0280770 A1* | 9/2014 | Burckart | G06F 40/186 | 709/219 |
| 2015/0012818 A1* | 1/2015 | Reichmann | G06F 40/166 | 715/236 |
| 2015/0020010 A1* | 1/2015 | Hale | G06F 3/04842 | 715/765 |
| 2015/0052498 A1* | 2/2015 | Chauhan | H04L 67/02 | 717/109 |
| 2015/0100406 A1* | 4/2015 | Klimetschek | G06Q 30/0242 | 705/14.41 |
| 2015/0142949 A1* | 5/2015 | Nair | H04L 67/10 | 709/224 |
| 2015/0186132 A1* | 7/2015 | Oliveri | G06F 8/34 | 717/120 |
| 2015/0234840 A1* | 8/2015 | Redenbach | G06F 3/0486 | 715/234 |
| 2016/0034276 A1* | 2/2016 | Webb | G06F 21/105 | 717/135 |

(56) References Cited

U.S. PATENT DOCUMENTS

| | | | |
|---|---|---|---|
| 2016/0225033 A1* | 8/2016 | Catalahana | G06Q 30/0276 |
| 2017/0185609 A1* | 6/2017 | Braghin | G06F 8/38 |
| 2018/0046609 A1* | 2/2018 | Agarwal | G06F 3/0482 |
| 2018/0095604 A1* | 4/2018 | Nguyen | G06F 40/186 |
| 2018/0203674 A1* | 7/2018 | Dayanandan | G06F 8/35 |
| 2018/0349516 A1* | 12/2018 | Dutta | G06F 3/0481 |
| 2019/0065153 A1* | 2/2019 | Olsson | G06F 8/38 |
| 2019/0065156 A1* | 2/2019 | Varadarajan | G06F 8/34 |
| 2019/0065157 A1* | 2/2019 | Varadarajan | G06F 8/34 |
| 2019/0065158 A1* | 2/2019 | Varadarajan | G06F 8/34 |
| 2019/0065159 A1* | 2/2019 | Varadarajan | G06F 8/36 |
| 2019/0065487 A1* | 2/2019 | Olsson | G06F 16/957 |
| 2019/0155585 A1* | 5/2019 | June | G06F 8/38 |

* cited by examiner

CONFIGURING COMPONENTS IN A DISPLAY TEMPLATE BASED ON A USER INTERFACE TYPE

CROSS REFERENCES

The present Application for Patent is a Continuation of U.S. patent application Ser. No. 16/138,943 by Gonzalez et al., entitled "CONFIGURING COMPONENTS IN A DISPLAY TEMPLATE BASED ON A USER INTERFACE TYPE," filed Sep. 21, 2018; assigned to the assignee hereof, and expressly incorporated herein.

FIELD OF TECHNOLOGY

The present disclosure relates generally to database systems and data processing, and more specifically to configuring components in a display template based on a user interface type.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support a number of applications and pages for viewing CRM information, updating data records, or performing other CRM or data-related activities. Users may access these applications and pages on different user devices. However, displaying a same application on different types of devices or in different sizes of user interfaces may result in a poor user experience. For example, certain components displayed in the application may be designed for display in one type of user interface (e.g., on a mobile phone or on a desktop screen), and displaying this component in another type of user interface may inefficiently utilize the user interface display resources or—in some extreme cases—may break the application (e.g., causing rendering of the component or the application to fail). Furthermore, defining separate versions of the application for different types of user interfaces may improve the display for each type of user interface, but will also lead to synchronicity issues. For example, changes to an application or a component displayed in the application will not carry across the different user interface types due to the different application definitions. Additionally, such a system may be inefficient with regard to memory resources, as the system needs to store separate application and component definitions for each type of user interface. Such a system scales poorly as support for new user interface types is added.

DETAILED DESCRIPTION

Figure 1:
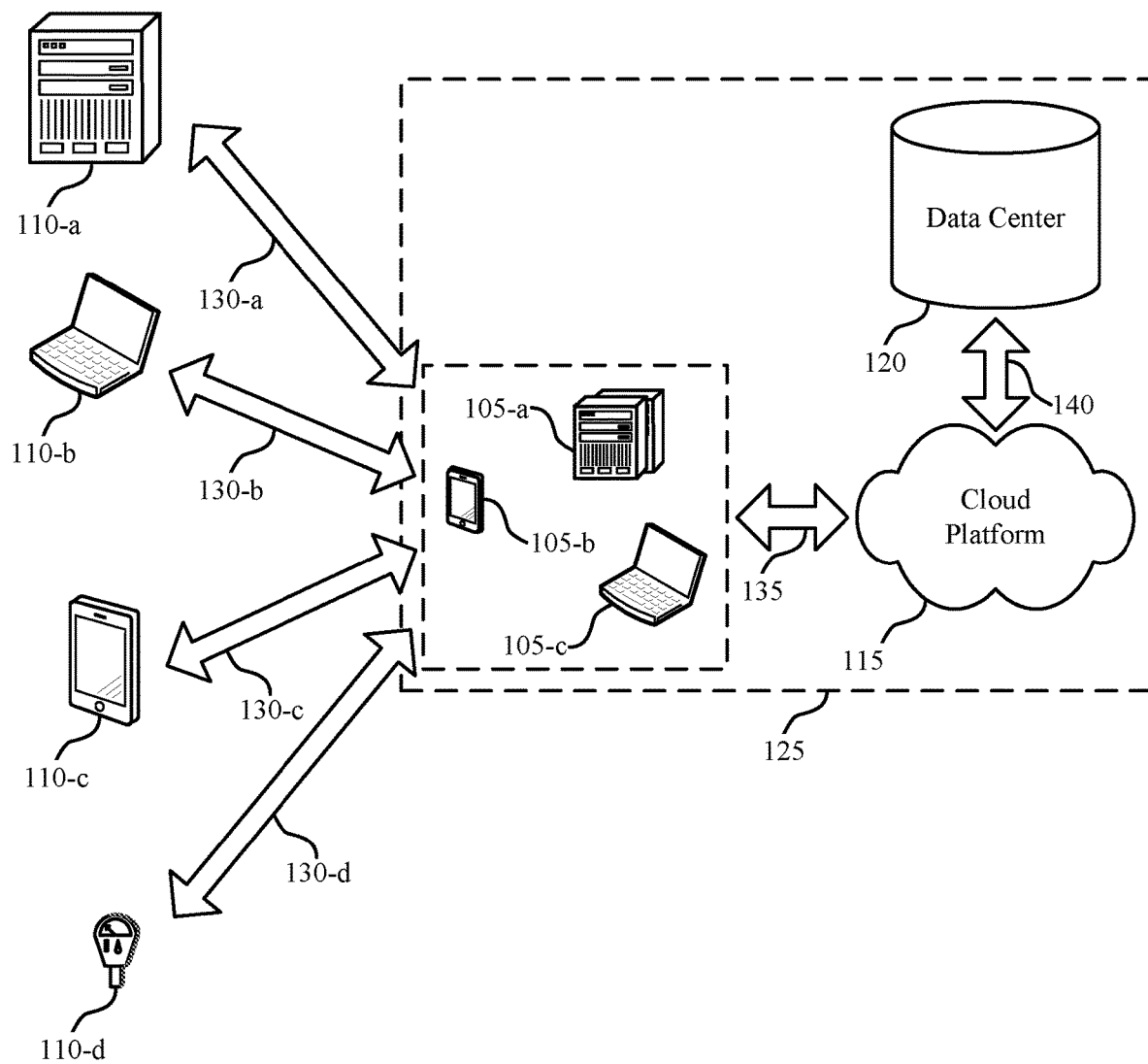
FIG. 1 illustrates an example of a system for cloud computing that supports configuring components in a display template based on a user interface type in accordance with aspects of the present disclosure.

A system (e.g., a cloud-based system supporting CRM solutions) may support a number of applications, pages, or both for displaying components. These components may display information, perform defined actions, provide links to other applications (e.g., third-party applications outside the cloud-based system), or provide any number of other features as indicated in the component definitions. The applications, pages, and components may be configurable by a user (e.g., an administrative user of an organization, a developer writing code to support backend or frontend processes, etc.). For example, an administrative user may create and customize a display template for an application or page using a template customization application (e.g., an application builder). The template customization application may support building applications or pages that can be rendered on a number of different user interface types.

In the template customization application, a user may build an application (or page) using a display template. The display template for each application may support rendering in one or more user interface types. For example, the user may select a display template for an application that supports both large and small form factors. The template customization application displays the selected display template in a user interface with a user interface type switcher, where the user may switch between the supported large and small form factor views for the display template (e.g., a desktop view and a mobile view). Both of these views may be supported by a single underlying metadata file or container for the application display template. The template customization application may also include support for a set of components, where each component of the set is defined by a single respective metadata file for that component (e.g., for all user interface types supported by that component).

The user may add a component to the display template for the application (e.g., using a drag-and-drop user input). This may automatically add a reference to this component into the underlying metadata file for the display template. When the component is added, the template customization application may identify the currently displayed user interface type and may determine whether the added component supports rendering in this identified user interface type (e.g., based on identifying any tags indicating user interface type support in the component design file). The template customization application may display the component in the display template based on this rendering determination. For example, if the component supports rendering in the currently selected user interface type, the display template may display a functional version of the component. If the component does not support rendering in the currently selected user interface type, the display template may still display the component, but the component may be displayed as a placeholder. If the user switches to a different user interface type supported by the display template, the template customization application may re-determine rendering support for each of the components in the display template based on this new user interface type. All components added to the display template in the first user interface view may be re-rendered in the second user interface view, as both views rely on the same underlying metadata file for the display template. In some examples, a component may support different display variants for the different user interface types (e.g., where each display variant may be defined in the single metadata file for that component).

How to display components (e.g., whether to render a component in a certain user interface type or not) may be further determined based on other user inputs, such as visibility rules or logical rules. A visibility rule may statically define the visibility of a component in a display template. For example, if a component supports rendering in both desktop and mobile use cases, a user may input a visibility rule to not render the component in the mobile user interfaces. A logical rule may dynamically determine how to display a component based on one or more logical inputs (e.g., at runtime for the application). These logical inputs may include information related to a user accessing the application at runtime, data values displayed in the display template, a current user interface type for displaying the application, or some combination of these or other logical inputs.

Once an application is defined in the template customization application (e.g., for all of the user interface types supported by the display template), the user may activate the application for use by end users. When these end users run the application on a user device, the user device or an application server may determine the user interface type of the device (e.g., the device type or a form factor) and may display the application using the corresponding display template view. When displaying the application at runtime, the user device may not render any components not supporting the user interface type (e.g., the components displayed as placeholders in the corresponding display template during application building will not be displayed at runtime). In this way, all components displayed for the application support rendering at the user device, and the resulting display has been customized at the template customization application to effectively use the display resources of the user device.

Aspects of the disclosure are initially described in the context of an environment supporting an on-demand database service. Additional aspects of the disclosure are described with reference to systems, a template customization application, and application renderings for different user interface types. Aspects of the disclosure are further illustrated by and described with reference to apparatus diagrams, system diagrams, and flowcharts that relate to configuring components in a display template based on a user interface type.

FIG. 1 illustrates an example of a system 100 for cloud computing that supports configuring components in a display template based on a user interface type in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The subsystem 125 may support a number of applications, pages, or both for displaying components related to CRM processes, data management, messaging, or any other supported functionality. These applications, pages, and components may be configurable by a user (e.g., an administrative user of an organization, a developer writing code to support backend or frontend processes, etc.). For example, an administrative user may create and customize a display template for an application or page using a template customization application (e.g., an application builder running on a cloud client 105). The template customization application may support building applications or pages that can be rendered on a number of different user interface types.

The template customization application may include a set of standard and/or custom components. These components may display data (e.g., retrieved from data center 120), perform actions, link to other applications, or perform any number of other supported functions. Each component may correspond to a single respective metadata file defining the component (e.g., how to display the component, how to interact with the component, what processes the component performs, etc.) for any user interface types that the component supports rendering in. For example, if a component can be rendered in both a user interface with a small form factor (e.g., on a mobile phone screen) and a user interface with a large form factor (e.g., on a desktop screen), the component may be defined for display in both of these form factor types within one underlying metadata file. A design or configuration file for the component may indicate the supported user interface types (e.g., using tags).

In the template customization application, a user may build an application (or page) using a display template. The display template for each application may support rendering in one or more user interface types (e.g., similar to each component). For example, the user may select a display template for an application that supports both large and small form factors. The template customization application displays the selected display template in a user interface with a user interface type switcher, where the user may switch between the supported large and small form factor views for the display template (e.g., a desktop view and a mobile view). Both of these views may be supported by a single underlying metadata file or container for the application display template. The template customization application may also display the set of components that can be added to the display template.

The user may add a component to the display template for the application (e.g., using a drag-and-drop user input). This may automatically add a reference to this component into the underlying metadata file for the display template. When the component is added, the template customization application may identify the currently displayed user interface type and may determine whether the added component supports rendering in this identified user interface type (e.g., based on identifying any tags indicating user interface type support in the component design file). The template customization application may display the component in the display template based on this rendering determination. For example, if the component supports rendering in the currently selected user interface type, the display template may display a functional version of the component. If the component does not support rendering in the currently selected user interface type, the display template may still display the component, but the component may be displayed as a placeholder indicating that the component does not support rendering for this user interface type.

If the user switches to a different user interface type supported by the display template, the template customization application may re-determine rendering support for each of the components in the display template. If a component supports rendering for this second user interface type, the template customization application may display a functional version of the component in the display template for this second user interface type. In some cases, this may involve modifying the display of the component (e.g., if the component did not support rendering in the first user interface type). All components added to the display template in the first user interface view may be re-rendered in the second user interface view, as both views rely on a same underlying metadata file for the display template. In some examples, a component may support different display variants for the different user interface types (e.g., where each display variant may be defined in the single metadata file for that component). In these examples, the display of the component in the second user interface type view may be modified from how the component was displayed in the first user interface type view.

How to display components (e.g., whether to render a component in a certain user interface type or not) may be further determined based on other user inputs, such as visibility rules or logical rules. A visibility rule may statically define the visibility of a component in a display template. For example, if a component supports rendering in both desktop and mobile use cases, a user may input a visibility rule to not render the component in the mobile user interfaces. A logical rule may dynamically determine how to display a component based on one or more logical inputs. These logical inputs may include information related to a user accessing the application at runtime, data values displayed in the display template, a current user interface type for displaying the application, or some combination of these or other logical inputs.

Once an application is defined in the template customization application (e.g., for all of the user interface types supported by the display template), the user may activate the application for use by end users. When these end users run the application on a user device (e.g., a cloud client 105 or a contact 110), the user device or an application server may determine the user interface type of the device (e.g., the device type or a form factor) and may display the application using the corresponding display template view. When displaying the application at runtime, the user device may not render any components not supporting the user interface type (e.g., the components displayed as placeholders in the corresponding display template during application building). In this way, all components displayed for the application support rendering at the user device, and the resulting display has been customized at the template customization application to effectively use the display resources of the user device.

Conventional systems may either implement a single application definition across all supported user interface types or may implement separate application definitions for each supported user interface type. In the first case, displaying a same application on different types of devices or in different sizes of user interfaces may result in both a poor application performance and a poor user experience. Certain components displayed in the application may be designed for display in one type of user interface (e.g., on a mobile phone or on a desktop screen) and displaying this component in another type of user interface may inefficiently utilize the user interface display resources of the user device. For example, displaying an application designed for a desktop view in a mobile view may require a user to perform a large amount of scrolling to find relevant data and may reduce the efficiency of the mobile user interface. In some cases, attempting to render components defined for one user interface type in another user interface type may break the application (e.g., causing rendering of the component or the entire application to fail). This may greatly reduce the processes supported by the application on certain user interface types. In the second case, defining separate versions of the application for different types of user interfaces may improve the display for each type of user interface, but may also lead to synchronicity issues. For example, changes to the definition or processing performed by an application or a component will not update the application or component for all of the different user interface types due to the different application definitions. Additionally, such a system may be very inefficient with regard to memory resources (e.g., as the system needs to store separate application and component definitions for each type of user interface) and user efficiency (e.g., as the user needs to add the same components for an application into multiple different displays to support multiple user interface types). Such a system may also scale poorly as support for new user interface types is added.

In contrast, by implementing shared metadata files for different user interface types and handling rendering at both a template customization application and user devices running the application, the system 100 may improve the performance of applications across a number of user interface types while limiting the memory overhead. Because each display template and each component corresponds to a single respective metadata file defining that template or component, the system 100 may maintain synchronicity across user interface types for an application. For example, adding a component to the mobile view of a display template may automatically add the component to the desktop view of the display template (e.g., due to both views sharing a same underlying metadata file). Additionally, if the added component initially only supports rendering in small form factors, but later large form factor rendering support is added for the component, the component may automatically be displayed in the desktop view of the application without any additional user input due to the single metadata file for the component and the single metadata file for the display template. Furthermore, storing a single underlying metadata file for each component and template may significantly reduce memory overhead (e.g., as compared to storing a different metadata file for each user interface type supported by each component or template).

The system 100 may also greatly improve the user experience at user devices running the application. For example, as different views can be defined for different user interface types (e.g., based on a same display template), the application may be optimized for all supported user interface types. This may greatly improve the performance of the application at certain user interface types and may support improved user interfaces at the different user interface types. For example, an application originally designed for devices with large form factors may be designed with an optimized user interface for devices with small form factors without creating an entire new definition of the application. Additionally, by handling many user interface type rendering decisions at design time (e.g., in the template customization application), the system 100 may reduce the processing resources required at runtime for determining how to render the application, improving the application processing latency. However, logical rules are still supported by the system 100 for dynamic rendering decisions at runtime.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
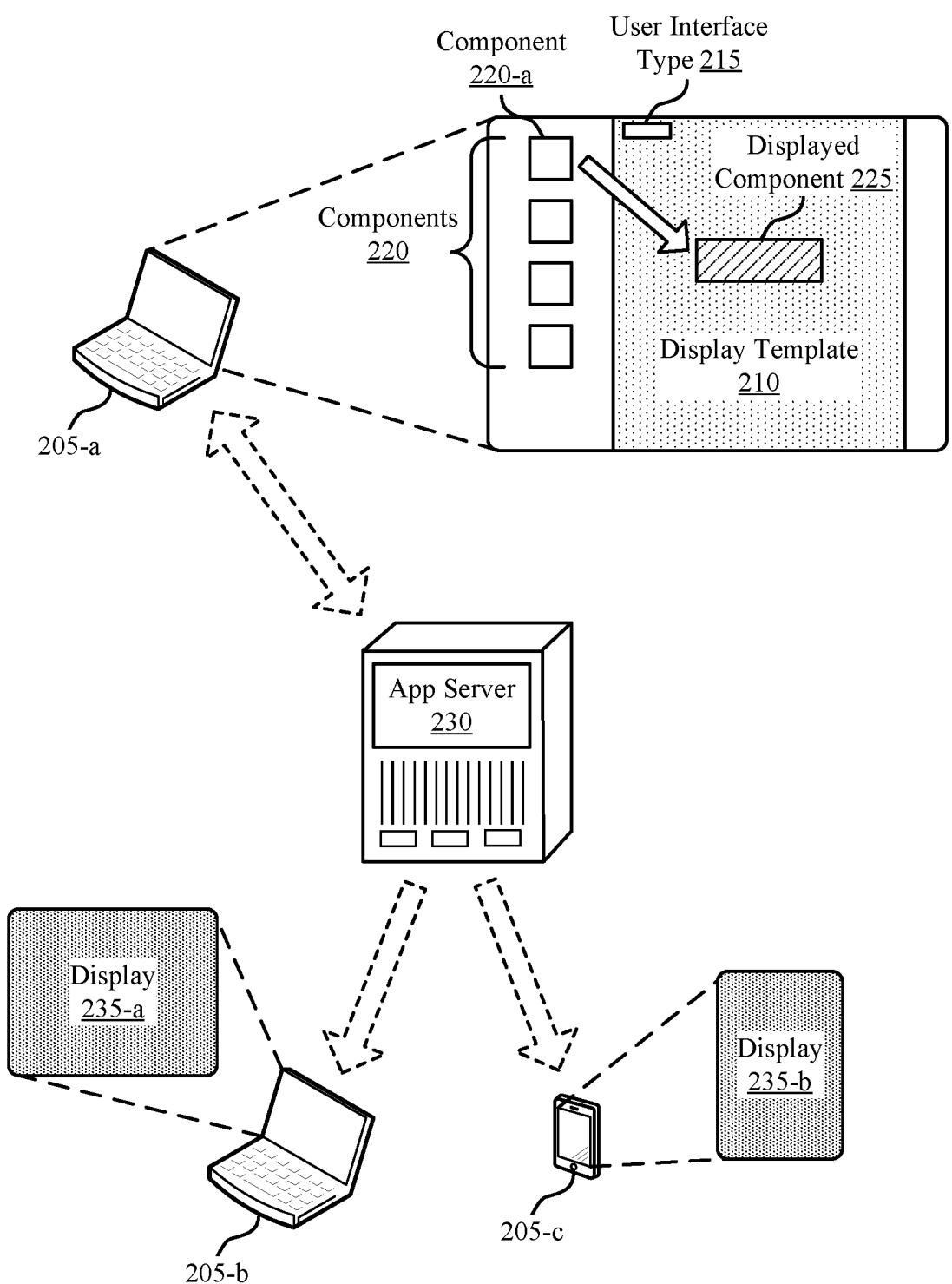
FIG. 2 illustrates an example of a system that supports configuring components in a display template based on a user interface type in accordance with aspects of the present disclosure.

FIG. 2 illustrates an example of a system 200 that supports configuring components in a display template based on a user interface type in accordance with aspects of the present disclosure. The system 200 may include a number of user devices 205, which may be examples of cloud clients 105 or contacts 110 as described with reference to FIG. 1. An administrative user may operate a first user device 205-a running a template customization application (e.g., an application builder). Using user device 205-a and the template customization application, the administrative user may define a display template 210 for displaying an application or page in different user interface types 215. For example, the same application (e.g., supported by a single underlying metadata file or container) may be displayed differently on different user devices 205 corresponding to different user interface types 215. A user accessing an application or page on a user device 205-b (e.g., a laptop or desktop computer corresponding to a large form factor) may view a first display 235-a, while a user accessing the same application or page on a user device 205-c (e.g., a mobile phone corresponding to a small form factor) may view a second display 235-b with different rendered components 220 or component variants than the first display 235-a.

The template customization application may allow a user to customize applications and pages for display on different types of user devices 205 (e.g., mobile phones, smartwatches, tablets, desktops, laptops, etc.). With custom application support at a user device 205 (e.g., including at a mobile device), the user device 205 may support switching between different applications, where the set of applications to switch between may include user-defined or user-selected applications. With custom page support (e.g., including support for custom record home pages), a user device 205 may display data records that include customizable information and components 220. In some cases, these pages may be activated for some user interface types 215 and not others (e.g., an administrative user may active a custom page for one type of form factor). An administrative user may define a custom page as a default page for a user or group of users (e.g., users within a same organization). The template customization application may also support components 220, display templates 210, or both that support rendering in a single type of user interface or multiple types of user interfaces. Furthermore, the template customization application may support rules (e.g., visibility rules, logical rules, etc.) based on a user interface type 215 running the application or displaying the page, such that a user may control the visibility of components 220 in an application or on a page based on the user interface type 215.

To support different display 235 renderings for different user interface types, the system 200 may include customization options for users (e.g., developers, administrative users, etc.). For example, the system 200 may support a set of standard components 220 (e.g., components 220 predefined in the system 200) and any number of custom components 220 created by developers. Each of these components 220 may support rendering in any number of user interface types 215. For example, a subset of components 220 may only be applicable (e.g., may support rendering) for one user interface type 215, while other components 220 may be applicable for multiple user interface types 215. In some cases, components 220 supporting multiple user interface types 215 may render differently in different user interface types 215. A user interface type 215 may refer to a type of device, a form factor, or some combination of these. In one specific example, at the code level, user interface types 215 may be defined by form factors, while at the user interface level, the user interface types 215 may be defined by device types. Different form factors may refer to different user interface sizes, such as "Small," "Medium," "Large," etc. Different device types may refer to different physical devices, such as mobile phones, smartwatches, tablets, desktops, laptops, etc. In some cases, certain form factors may be associated with certain device types. For example, a "Small" form factor and a mobile phone may be examples of equivalent user interface types 215. Similarly, a "Large" form factor may be equivalent to a desktop.

Each component 220 may be supported by a single underlying metadata file defining support for specific user interface types 215. For example, the design file or configuration file for a component 220 may specify the form factors supported by that component. In some cases, these supported form factors may be indicated by tags in the design file. A user (e.g., a developer) may modify the tags in the design file to update the form factors supported by a particular component 220. In some cases, a developer may modify the tags for custom components 220 but may not modify tags for standard components 220. Below is one specific example of a component design file indicating support for rendering in both small and large form factors:

```
<design:component>
    <design:supportedFormFactors>
        <design:supportedFormFactor type = "Small" />
        <design:supportedFormFactor type = "Large" />
    </design:supportedFormFactors>
    <flexipage:template>
        . . .
    </flexipage:template>
</design:component>
```

While the above design file indicates that the component 220 will work in multiple form factors (e.g., both small and large user interface types 215), certain components 220 may only be valid for a single form factor. Examples include components that interact with mobile applications—which may support rendering in mobile or small user interface types 215 but not desktop or large user interface types 215—and feed publisher components, which may be part of an action bar on a desktop and accordingly may support rendering in desktop or large user interface types 215 but not mobile or small user interface types 215.

Another example of an underlying metadata file for a component 220 (e.g., which may be a different type of file than the one described above) is provided below, specifying support for only small form factors:

```
<?xml version = "1.0" encoding = "UTF-8"?>
<ComponentBundle xmlns = "http://example/metadata">
    <isExposed> true </isExposed>
    <apiVersion> 44.0 </apiVersion>
    <description> test description </description>
    <masterLabel> Test Label </masterLabel>
    <tags>
        <tag> RecordHome </tag>
    </tags>
    <tagConfigs>
        <tagConfig tags = "RecordHome">
            <supportedFormFactors>
                <supportedFormFactor type = "Small">
            </supportedFormFactor>
            </supportedFormFactors>
        </tagConfig>
    </tagConfigs>
</ComponentBundle>
```

In some cases, all components 220 may declare the supported user interface type or types 215 for that component 220. In other cases, some components 220 may not declare the supported user interface type or types 215 in an underlying file. For example, legacy custom components 220 may not include any tags indicating form factor support in a metadata file. To handle such components 220, the system 200 may implement a user interface type map (e.g., a form factor map). The user device 205-a or an application server 230 supporting the template customization application may store the form factor map in memory. This form factor map may indicate the supported form factor(s) for a component 220 based on the interfaces that the component 220 implements (e.g., using an interface-to-form factor mapping).

In addition to components 220, display templates 210 may also declare the user interface types 215 supported by the given display template 210 for an application or page. For example, a display template 210 may be associated with any number of user interface types 215, where the display template 210 is supported by a same underlying metadata file or container for all of the supported user interface types 215. In some cases, this metadata file may be the same type of metadata file as the ones defining the components 220 (e.g., as a display template 210 may be a special type of component 220). The metadata file supporting the display template 210 may include tags indicating the supported user interface types 215. In other cases, the system 200 may implement a form factor table (e.g., the same one or a different one used for determining rendering support for components 220) to determine the user interface types 215 supported by a given display template 210 if the display template 210 does not include explicit declarations of the user interface types 215 in code. For example, an application page may correspond to an "availableForAllPageTypes" metadata container, an "appHomeTemplate" interface, and an "AppHome" tag. This metadata container, interface, and/or tag may support both "Large" and "Small" form factors according to the interface-to-form factor mapping. A component 220 or display template 210 referencing any of these in an underlying metadata file may be determined to support both "Large" and "Small" form factors according to the form factor map stored in memory. In some case, in addition to components 220 and display templates 210, certain applications or pages may support specific user interface types 215. In this way, supported user interface types 215 (e.g., supported form factors) may be specified at multiple levels within the system for robust rendering support.

The rendering support for components 220, display templates 210, applications, pages, or some combination of these may be used for a number of validations in the template customization application. In a first example, the template customization application may determine valid user interface types (e.g., form factors) for assignment based on the user interface types 215 supported by the display template 210, the application, or the page. In a second example, the template customization application may determine valid components 220 to be saved to a metadata page for a display template 210 based on the user interface types 215 supported by the components 220 and the display template 210. In a third example, the template customization application may determine valid user interface type 215 values that can be used in component visibility rules based on the user interface types 215 supported by the components 220 and the display template 210.

More specifically, when attempting to save an updated display template 210 (e.g., when saving the metadata file supporting the display template 210) for an application or page, the system may check the rendering support for the display template 210 and for the components 220 included in the display template 210. If the display template 210 includes a component 220 supporting a set of user interface types 215 mutually exclusive from the set of user interface types 215 supported by the display template 210, the display template 210 (e.g., the underlying metadata file for the template) may fail to save successfully. In other cases, the template customization application may perform a successful save operation in such a situation, in case the rendering support for the component 220 or the display template 210 is updated in the future. For example, if component 220-a only supports mobile rendering and is added to the display template 210 for an application only supporting desktop rendering, the template customization application may, in some cases, support saving the updated underlying metadata file. In this case, if a developer later updates the component 220-a definition to support rendering on desktop, the component 220-a may automatically begin rendering for the application in desktop use cases (e.g., based on the component 220-a already being included in the definition for the application).

The rendering support for components 220 may be used for displaying the components 220 in the display template 210. For example, when a component 220-a is added to a display template 210 (e.g., from a set of components 220 supported by the application builder), how the component 220-a is displayed in the template can be based on the current user interface type 215 selected for the display template 210. For example, an administrative user building an application or page in the template customization application may drag a component 220-a from a list of components 220 and drop the component 220-a in the display template 210. The template customization application may determine the rendering support for the added component 220-a (e.g., by querying for or otherwise retrieving information about the tags in the underlying metadata file for the component 220-a). If the component 220-a supports rendering in the current user interface type 215 for the display template 210, the displayed component 225 in the template may be a functional version of the component 220-a. This functional version of the component 220-a may be displayed in the same way or a similar way as the component 220-a would be rendered in the given user interface type 215 when a user device 205 actually runs the application. If the component 220-a does not support rendering in the current user interface type 215 for the display template 210, the displayed component 225 displayed in the template may be a placeholder version of the component 220-a. This placeholder may indicate that rendering of this component 220-a is not supported for the current user interface type 215 (e.g., the placeholder may include an "Unsupported form factor" message). If this application is run on this user interface type 215, the component 220-a may not be rendered in the display 235 based on the lack of rendering support. That is, the placeholder version displayed in the template as the displayed component 225 may be removed or otherwise not displayed at runtime.

In some cases, not rendering the component 220-a may be handled by a component visibility rule form factor value. For example, based on the rendering support for the component 220-a, the template customization application may automatically update a visibility rule for factor value or values to include just the supported user interface types 215. These visibility rules may be used when determining how to render the displayed component 225 at runtime. By handling rendering support at design time with these component visibility rule form factor values, the template customization application may save processing resources at runtime and correspondingly reduce the latency involved in displaying the application or page. The displayed component 225 may still be included in the display template 210 for the user interface type 215—albeit, as a placeholder—to indicate that the component 220-a is referenced in the underlying metadata file. As this underlying metadata file is shared across all user interface types 215 supported by the display template 210 for the application, adding a placeholder component 220-a to a display template 210 for a first user interface type 215 may automatically add the functional component 220-a to the display template 210 for any other user interface types 215 of the application that the component 220-a supports rendering in.

Some components 220 that support multiple user interface types 215 may render differently for different user interface types 215. In a first example, a component 220 may be an example of a responsive component. A responsive component may render differently in different user interface types 215, but the different renderings may be based on the same underlying content or information (e.g., the underlying metadata file for a responsive component may define a single implementation to be used across all supported user interface types 215). The different display versions or variants for the different user interface types 215 may be based on different rendering rules (e.g., cascading style sheets (CSS) rules) for the components 220 in the user interface of the application based on the different user interface types 215. In a second example, a component 220 may be an example of an adaptive component. An adaptive component may display different information or content in different user interface types 215. For example, the underlying metadata file for an adaptive component may contain different implementations of the adaptive component for different user interface types 215.

Examples of adaptive components may include feed containers and related lists. A feed component may be an example of a comment thread. In some cases, a desktop version of a feed container may include both a publisher (e.g., an input component for adding comments) and a feed (e.g., an indication of the previously posted comments). In contrast, a mobile version of the feed container may include a different variant of the feed without the publisher. In some cases, the underlying file for the feed component contains logic which provides different functions based on the user interface type 215. For example, a JavaScript provider may determine the type of user device 205 for rendering and may provide a first implementation (e.g., a "recordFeedContainerDesktopWrapper") to one user device 205-b while providing a second implementation (e.g., a "recordFeedContainerMobile") to another user device 205-c. The one user device 205-b may render the component 220 in a display 235-a according to a first display variant while the other user device 205-c may render the component 220 in a display 235-b according to a second display variant, where the two display variants are based on different implementations in the underlying code for the component 220. Similarly, a related list component (e.g., a component displaying information corresponding to related data objects) may use two different underling implementations (e.g., a "relatedListsContainer" and a "relatedCardContainer") for different user interface types 215.

In some cases, components 220 or other display aspects may be displayed differently in different user interface types 215 based on user aesthetics. For example, a desktop display template 210 may include a tabset component. However, tabs may not be user friendly or efficiently utilize the available display resources for a mobile display template 210. Accordingly, a tabset component may be rendered in a mobile display template 210 as a set of drill-ins, which may be referred to as "stacked tabs." As such, this tabset/drill-in component may have a single underlying metadata file (e.g., as each of these display variants display similar or the same information) defining different rendering versions for the different user interface types 215.

In addition to underlying rendering support, how components 220 are displayed for an application may be based on visibility rules. For example, visibility rules may define whether or not to render a certain component 220 (e.g., where a component 220 may be hidden regardless of rendering support). Visibility rules may be based on the supported user interface types 215 for a display template 210. For example, if a display template 210 only supports a "Large" form factor, the visibility rules for that display template 210 may be limited to defining form factor-based visibility for the supported "Large" form factor. That is, a user may not define a visibility rule for the display template 210 if "FormFactor equals Small," as the form factor for the display template 210 cannot equal "Small" based on the form factor type supported.

In some cases, how an application or page is displayed at runtime may be based on logical rules. For example, a display 235 may dynamically show or hide components 220 based on some input values. These input values may include a user identifier for a user accessing the application or page, a role for the user accessing the application or page, a data value associated with a specific data record or object referenced in the application, a pre-defined or configurable permission set, or a combination thereof. In some cases, the form factor value for the user device 205 running the application or page may be used as an input to a logical rule. In one specific case, this form factor may dynamically change at runtime (e.g., if a user changes the size of the window running the application or page). In these cases, the component 220 visibility may adaptively change based on the dynamically changing user interface type 215 and the defined logical rule. In some cases, a logical rule may use a user interface type 215 in a conditional statement. However, the application programming interface (API) may provide the possible user interface types 215 for use in logical rules based on the user interface types 215 supported by the display template 210 or the specific application or page.

Once an administrative user has configured a display template 210 for an application or page (e.g., the display template 210 includes all of the selected components 220 as displayed components 225 in a format defined by the user) for all user interface types 215 supported by the display template 210, the administrative user may activate the application or page. Activating the application or page may allow other users to access, view, and interact with the custom application or page. In some cases, the template customization application may include an ActionOverride table. In this table, an administrative user may select which applications or pages are active or which applications or pages override other applications or pages (e.g., default applications or pages). In some cases, the system 200 may enforce that a custom page overriding another page must support the same user interface types 215 as the other page. The ActionOverride table may support activation or override by user interface types 215. For example, the display that a user device 205 displays when running an application may be based on a number of factors (i.e., "pivots"), including but not limited to custom application definitions, data object or data record types, a user profile, and a user interface type 215 (e.g., a form factor). The application or page display 235 that a user device 205 will display for a user at runtime may be based on a set of hierarchical rules defined in an assignment hierarchy (e.g., for a record page, the system 200 may implement a record page assignment hierarchy). This assignment hierarchy may be based on the user interface type 215 for the user device 205 running the application or page, among many other parameters.

The template customization application may additionally perform a validation procedure when a user selects to activate an application or a page. The template customization application may validate a saving assignment for an ActionOverride (e.g., including a ProfileActionOverride). For example, if a user selects to activate an application or page for a certain user interface type 215, but the application or page—or the corresponding display template 210 selected for that application or page—does not support rendering in that user interface type 215 (e.g., as defined by a design file for the application, page, or display template 210), the template customization application may block activation for that unsupported user interface type 215.

In some cases, activating an application or page may push the application or page to a centralized system or server (e.g., an applications server 230). Other user devices 205 may then access and display the activated application or page by interacting with the application server 230 (e.g., via an API). In some cases, when operating online, running an application or page at a user device 205 may involve a link between the user device 205 and the application server 230 storing information about the application or page (e.g., the defined display template 210, the components 220 in the display template 210, any visibility or logical rules, etc.). In other cases, when operating offline, the user device 205 may store the information about the application or page locally. In some examples, the user device 205 may initially download support for the application or page from the application server 230 before running the application or page without requiring further interactions with the application server 230.

Some applications or pages may support operating offline at a user device 205. An application or page may support offline capabilities by implementing data priming. In some cases, a subset of components 220 may support priming (e.g., highlights panels, detail panels, related list containers, etc.), while a second subset of components 220 may not support priming. To support priming, a user device 205 may store a list of actions needed to retrieve the data or information used for rendering the offline-capable components. A priming process may execute these actions to prime a number of applications or pages for offline use. In some cases, a user device 205 may prefetch data for a number of important or often-used entities (e.g., seven entities), referred to as "hero" entities, from the application server 230 or a database. The user device 205 may prefetch a set number of records (e.g., fifty records) for each of these entities (e.g., to limit the memory overhead for the priming process). The user device 205 may also prefetch the definition (e.g., the underlying metadata) for each application or page supporting offline-capabilities, as well as for each component 220 rendered in the application or page that is also offline-capable. The results of this pre-fetching process may be stored in action storage at the user device 205. When an application or a page is selected for rendering at a user device 205 at runtime, each component 220 being rendered may fire an action to fetch the information needed to render that component 220. If the actions for these components 220 have been primed and are stored in the action storage, the components 220 may receive the results from the action storage, even if the user device 205 is currently offline. To support custom applications or pages, a user device 205 may support a system that can determine what data and/or metadata is need to prime a component 220 using static analysis. In this way, the priming process can dynamically determine what data an application or page will need to support rendering offline, and may pre-fetch and cache this data.

An application launcher at a mobile device may indicate the applications or pages that are activated and available for the mobile device—or the "Small"—user interface type 215. A user may navigate between these applications or pages using user-defined navigation items in the applications or the application launcher. These navigation items may be selected or defined by an administrative user or by an end user running the applications on the user device 205. For example, an end user may modify a configuration for the navigation menu using a setup user interface. In some cases, the navigation menu may include a set of standard items and a number of custom items. Modifying the navigation menu may modify underlying metadata describing a set of mobile navigation menu items. The metadata for each navigation menu item may be stored in an AppMenuItem and may be retrieved by a device 205 at runtime via a navigation-menu Connect API (which in turn may implement an internal API, for example, at the application server 230). In some case, a mobile device may store an indication of a last used application, and may automatically re-render the display 235-*b* to show the last used application when the mobile device identifies a user profile.

Based on the rendering rules described herein, display 235-*a* for a first user interface type 215 (e.g., a desktop, laptop, or "Large" user interface type 215) may display a custom built application or page different than display 235-*b* for a second user interface type 215 (e.g., a mobile phone or "Small" user interface type 215). However, both displays 235 may be defined by the same display template 210 metadata file, saving memory resources and allowing for efficient configuration of display templates 210 at the application builder.

Figure 3:
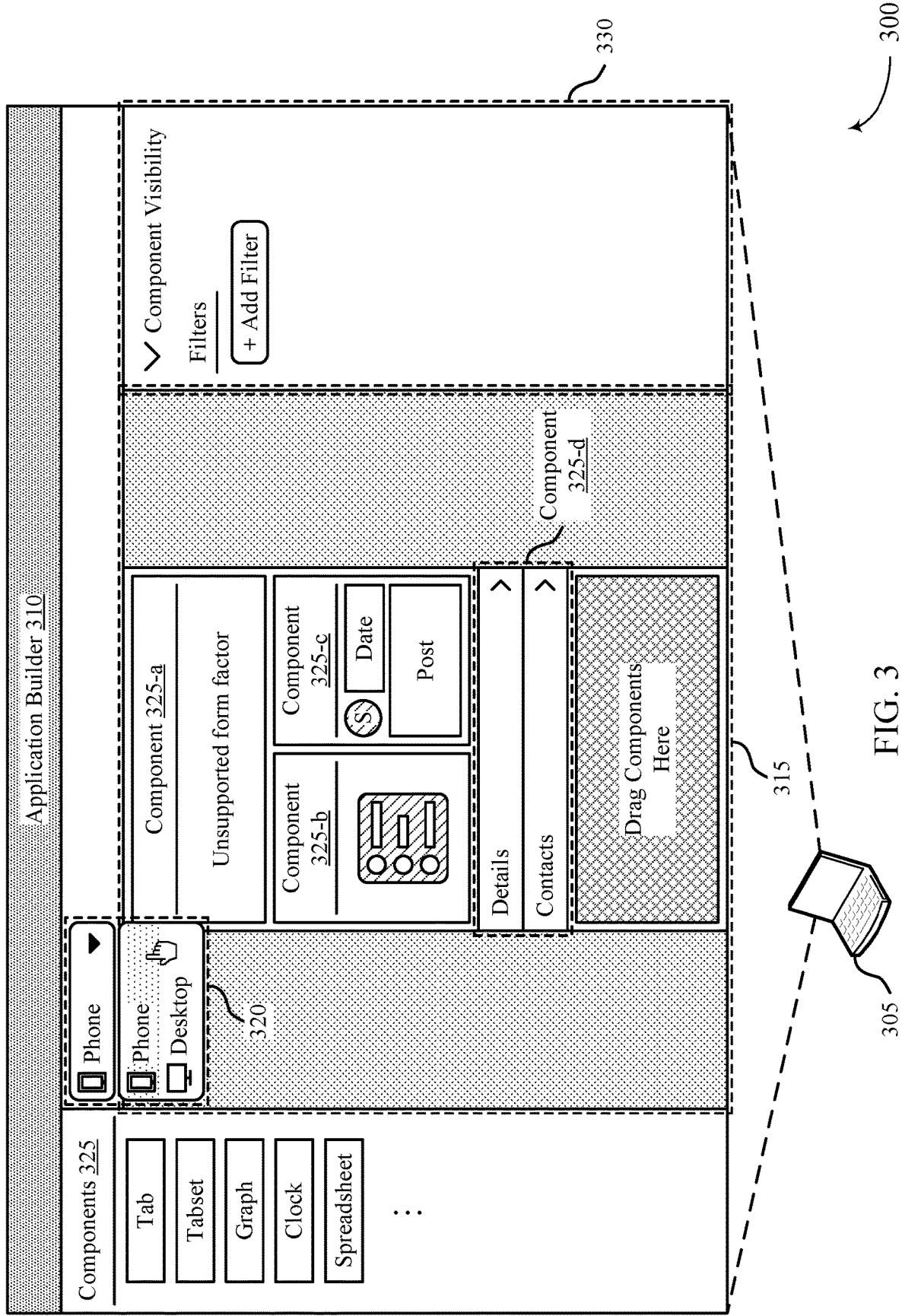
FIG. 3 illustrates an example of a template customization application that supports configuring components in a display template based on a user interface type in accordance with aspects of the present disclosure.

FIG. 3 illustrates an example of a template customization application 300 that supports configuring components in a display template based on a user interface type in accordance with aspects of the present disclosure. The template customization application 300 may run on a user device 305 that is operated by an administrative user, where this user device 305 may be an example of a user device 205 as described with reference to FIG. 2. In some cases, the template customization application 300 may be an example of an application builder 310. This application builder 310 may support the administrative user creating user interfaces for different user interface types 320 (e.g., mobile devices, desktops, tablets, etc.) using components 325. The application builder 310 may include a display template 315 showing the components 325 for a selected user interface type 320. This display template 315 may support user interfaces corresponding to different user interface types 320 for a same application based on a shared underlying metadata container or file. In this way, if a component 325 is added to the display template 315 for a phone user interface type 320, the component 325 is referenced in the underlying metadata file. As such, the component 325 is automatically also added to the display template 315 for the desktop user interface type 320 for the application (e.g., if the application supports both phone and desktop user interface types 320), as this desktop display template is based on the same underlying metadata file. The application builder 310 may handle whether these added components 325 support rendering in each of the user interface types 320 for an application.

In some implementations, the application builder 310 may allow an administrative user to extend applications from a first user interface type 320 to a new user interface type 320. For example, certain capabilities of a platform that were previously supported just on desktops may be extended to mobile devices using the application builder 310. These capabilities may include applications (e.g., standard and custom applications), navigation and corresponding navigation items, components, customizations (e.g., personalized information, items, components, or displays for specific users), or any other capabilities of the platform. Using the display templates 315, components 325, and rules (e.g., in a rules input module 330), the application builder 310 may support custom experiences for different user interface types 320, users, or groups of users. A user may customize a display template 315 by adding components 325 to the display template 315. In some cases, adding a component 325 may involve dragging and dropping a component 325 into the display template 315 from a component sidebar. The display template 315 may display the added components 325 similar to how the components 325 will be rendered in the selected user interface type 320. For example, components 325 supporting rendering in the selected user interface type 320 may be displayed as they would appear in that user interface type 320. However, the display template 315 may additionally include placeholders for components 325 that do not support rendering in the selected user interface type 320. Such placeholders will not be rendered when actually running the application on the selected user interface type 320.

In one example, as illustrated in FIG. 3, a user may add components 325-*a*, 325-*b*, 325-*c*, and 325-*d* into a display template 315. The display template 315 may currently show a first user interface type 320 (e.g., a mobile phone view of the page). Component 325-*a* may not support rendering in the current user interface type 320. For example, component 325-*a* may include a tag in its underlying metadata file indicating support for "Large" form factors but may not support "Small" form factors. The application builder 310 may display a placeholder version of component 325-*a* in the display template 315 indicating an "Unsupported form factor." However, this component 325-*a* may not be rendered at runtime for the current user interface type 320. For example, if a mobile phone runs the application illustrated in FIG. 3, component 325-*a* may not be displayed on the mobile phone.

Components 325-*b*, 325-*c*, and 325-*d* may support rendering in the current user interface type 320. As such, the application builder 310 may display components 325-*b*, 325-*c*, and 325-*d* as functional components 325 (e.g., as they would appear at runtime). These components 325-*b*, 325-*c*, and 325-*d* may be displayed according to standard display procedures or according to display variations specific to the current user interface type 320. For example, component 325-*d* may be an example of a tabset component. The application builder 310 may display component 325-*d* according to a mobile-specific display variant when the phone user interface type 320 is selected in the user interface type switcher (e.g., component 325-*d* is displayed as a set of drill-ins, one drill-in supporting information about details and one drill-in supporting information about contacts). If the user switched the view to the desktop user interface type 320 (e.g., by selecting the "desktop" option in the dropdown menu of the user interface type switcher), the display for this component 325-*d* may be modified according to a desktop-specific display variant for the component 325-*d* (e.g., component 325-*d* may be displayed as a set of tabs in a panel). Both of these display variants may be defined in a same metadata file for the component 325-*d*.

In addition to building interfaces for applications, an administrative user operating user device 305 may assign and activate applications for the different user interface types 320 using the application builder 310. In some cases, the user may input rules, such as component visibility rules, into the application builder 310 (e.g., using the rules input module 330). In one example, a user may specify a visibility rule to filter out certain components 325 for specific user interface types 320. The visibility rule may specify not to render component 325-*c* when the user interface type 320 equals "Small." In these cases, the application builder 320 may re-render component 325-*c* in the display template 315 for the phone view to be a placeholder version of the component 325-*c*. At runtime, based on this visibility rule, component 325-*c* may not be rendered if the page is displayed in a small user interface. As such, component visibility rules may support user interface type-specific displays, or may support specific displays for certain users, certain types of users, or certain special use cases (e.g., based on underlying data values). Applications that can dynamically change which components 325 are displayed based on user-defined rules may be referred to as dynamic applications or dynamic pages.

When building an application or page in the application builder 310, the application builder 310 may first display a set of possible display templates to select from. Each type of display template may indicate a general format for that display template type and the user interface types 320 supported by that display template 315. For example, a template defined as a "Header and Right Sidebar" may support rendering in both desktop and mobile cases. In this way, an administrative user may select a display template 315 based on a desired level of user interface support. When the user selects a specific template type, the application builder 310 may display a display template 315 formatted accorded to the selected template type. The user interface types 320 supported by this template type may be included in the user interface type switcher (e.g., a dropdown menu, that may be an example of a form factor switcher, a device type switcher, or some combination of the two). This switcher supports a user switching between different supported user interface type 320 views for the display template 315. In some cases, the components 325 displayed in the palette (e.g., the left sidebar, as illustrated in FIG. 3) within the application builder 310 may be filtered based on overlapping support with the selected template type. For example, if the template type only supports a large form factor (e.g., desktops), then the application builder 310 may include components 325 for selection that support the large form factor (e.g., only the large form factor, or both large and small form factors). In other cases, the application builder 310 may display a same set of components 325 for selection in the palette for any selected template type. When the user selects a template type and begins the application building process, the application builder 310 may create a new underlying metadata file or container for the new display template 315. This new underlying metadata file defines how to display all of the user interface types 320 supported by the new display template 315, and the metadata file contains indications of each of the components 325 added to the display template 315.

In some cases, the display template 315 may be for a page, such as an application page, a home page, or a record page. An application page may support creation of a home page for a third-party application (e.g., an application not associated with the application builder 310 or an underlying system). In this way, a user may easily access the third-party application (e.g., using a navigation menu). Application pages may also support global actions, which may be associated with other application plugins or database systems. For example, supported global actions may include adding call details to an application page, creating or updating records (e.g., data records in a database system), sending messages (e.g., email communications via an email application plugin), creating tasks, or any combination of these or other supported functions. The global actions supported by an application page may be displayed in an action bar or a highlights panel of the user interface. In some cases, a user may specify what actions are supported by an application page (e.g., using the application builder 310). A home page may be an example of a custom page with features specific to a certain user or type of user (e.g., a first type of user may view a first home page while a second type of user may view a second home page). The home pages may be customized in the application builder 310. A record page may display information related to a data record (e.g., an organization, a client, a product, an opportunity, etc.). The record page may also be customized in the application builder 310. In other cases, the display template 315 may be for an email application pane. A user may customize the email application pane in the application builder 310, and the custom email application pane may be displayed in an associated email application (e.g., so that a user may access relevant information without leaving the email application). In yet other cases, the display template 315 may be for any other type of application that a user can customize with components 325.

The application builder 310 may provide intuitive tools for administrative users and developers to create applications that can run seamlessly on the multiple different user interface types 320. For example, the application builder 310 may support a user running an application on a first user interface type 320 (e.g., desktop or mobile) and seamlessly transitioning the application onto a second user interface type 320 (e.g., mobile or desktop). The application builder 310 may include simple mechanisms both in code (e.g., the design files for components 325) and without code (e.g., the drag-and-drop mechanism for adding components 325 to a display template 315) to control component 325 behavior for different user interface types 320 (e.g., different form factors). For developers, the application builder 310 may include an interface to control if a component 325 supports rendering for a given user interface type 320 (e.g., a developer may declare form factor support for each component 325 using tags in the corresponding component design file). For administrative users, the application builder 310 may indicate component visibility for different user interface types 320 without requiring knowledge of the underlying code. The underlying metadata and runtime rendering procedures can handle component visibility so that an administrative user does not need to consider rendering support when creating the display templates 315, and yet the application can work seamlessly across a number of supported user interface types 320. That is, at runtime, runtime services may manage what is actually displayed for an end user on a user device, where this display is based on the display template 315 for the corresponding user interface type 320. This actual display may appear exactly like the display template 315, but with all placeholder versions of components 325 (e.g., such as the placeholder version for component 325-a) removed or otherwise not rendered. The runtime services may perform this actual rendering based on underlying metadata that includes information about availability of pages or applications, display templates 315, and components 325 in different user interface types 320 at runtime.

Figure 4:
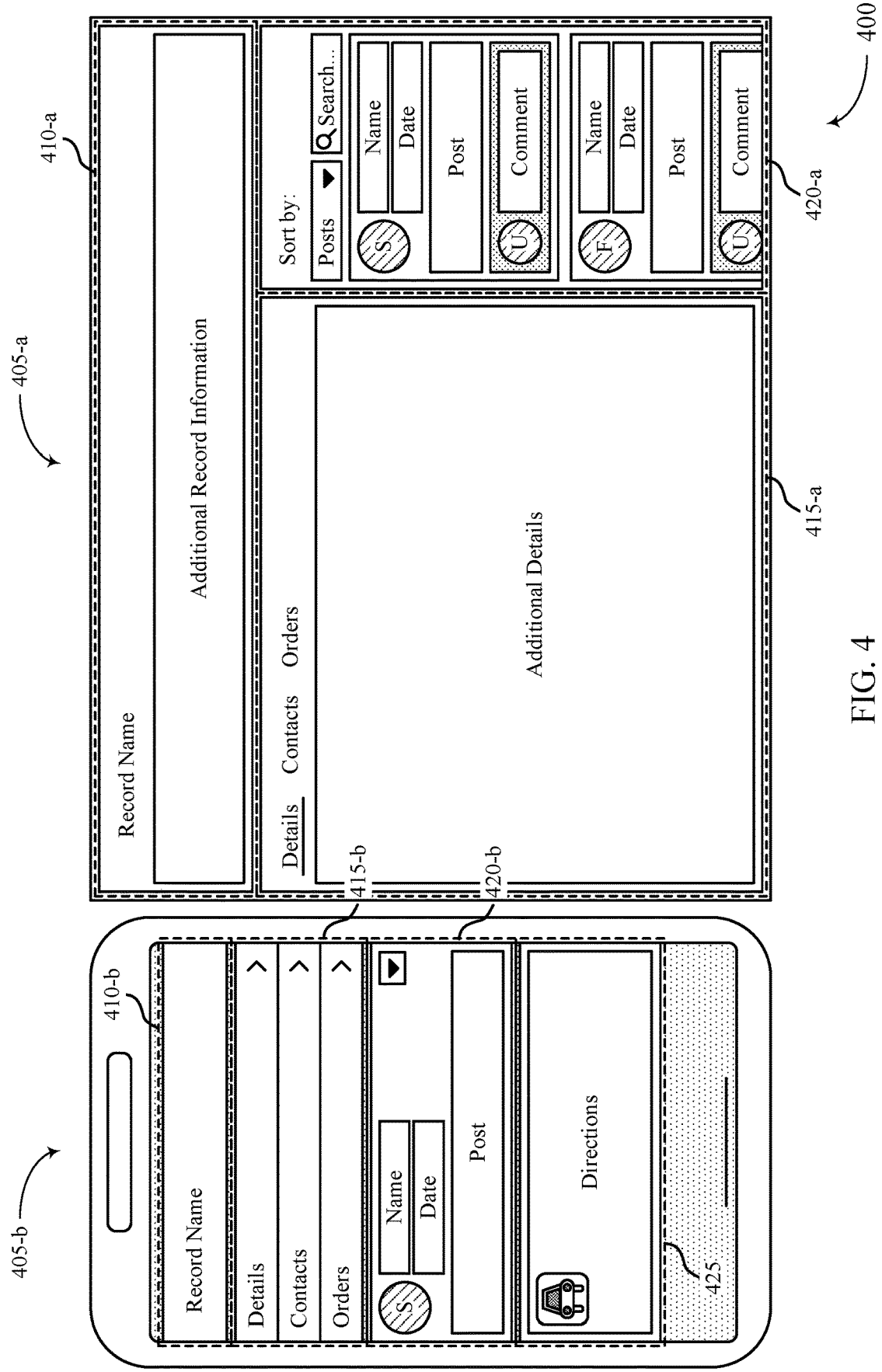
FIG. 4 illustrates examples of different application renderings for different user interface types that support configuring components in a display template based on a user interface type in accordance with aspects of the present disclosure.

FIG. 4 illustrates examples of different application renderings 400 for different user interface types 405 that support configuring components in a display template based on a user interface type in accordance with aspects of the present disclosure. The different application renderings 400 may correspond to a desktop or "Large" user interface type 405-a and a mobile device or "Small" user interface type 405-b. In some cases, additional application renderings may be supported for additional user interface types 405. The different application renderings 400 may be determined based on a display template defined for the application (e.g., a page). This display template may be configured by a user using a template customization application 300 as described above with reference to FIGS. 1 through 3. As illustrated, based on this display template with a single underlying metadata file, different user devices may display very different user interfaces for the same application.

For example, for user interface type 405-a, the user device may display the page with an identification component 410-a, a tabset component 415-a, and a comment thread component 420-a. These components may be displayed according to a "Header and Right Sidebar" display template. Due to the larger interface size, the user device may display a significant amount of additional details for many of these components. The format for displaying these components may be based on a display variant defined for user interface type 405-a.

For user interface type 405-b, the user device may display the page with an identification component 410-b, a tabset component 415-b, a comment thread component 420-b, and a map component 425. These components may be displayed according to the same display template as the identification component 410-a, tabset component 415-a, comment thread component 420-a. However, these components displayed in the user interface type 405-b may be rendered according to display variants defined for user interface type 405-b. Although these different user interface types 405 implement different display variants for the components, these components are defined in shared metadata files. For example, the identification component 410-a and the identification component 410-b are the same component, supported by the same underlying metadata. Updating the definition of identification component 410-a may automatically update the definition of identification component 410-b based on the shared metadata file, enforcing synchronicity of components between the different user interface types 405.

In some cases, components may be rendered in one user interface type 405 but not another. For example, the map component 425 may support rendering in a mobile device user interface type 405-b but not in a desktop user interface type 405-a. While the common display template for the page may display a placeholder for the map component 425 in the desktop user interface type 405-a at design time, the placeholder is not rendered at runtime. As such, the application rendering for the desktop user interface type 405-a does not include any indication of the map component 425 (e.g., despite an indication of the map component 425 existing in the underlying metadata file for the display template that defines the application rendering for this desktop user interface type 405-b). In some cases, the components rendered in these user interface types 405 may dynamically change based on logical rules. For example, if a price value for an order is above a certain threshold value, the desktop user interface type 405-a may render an additional component normally hidden based on a logical rule that displays follow-up information about the order. As illustrated, the different application renderings 400 may optimize user interface resources differently at different types of devices for improved application performance.

Figure 5:
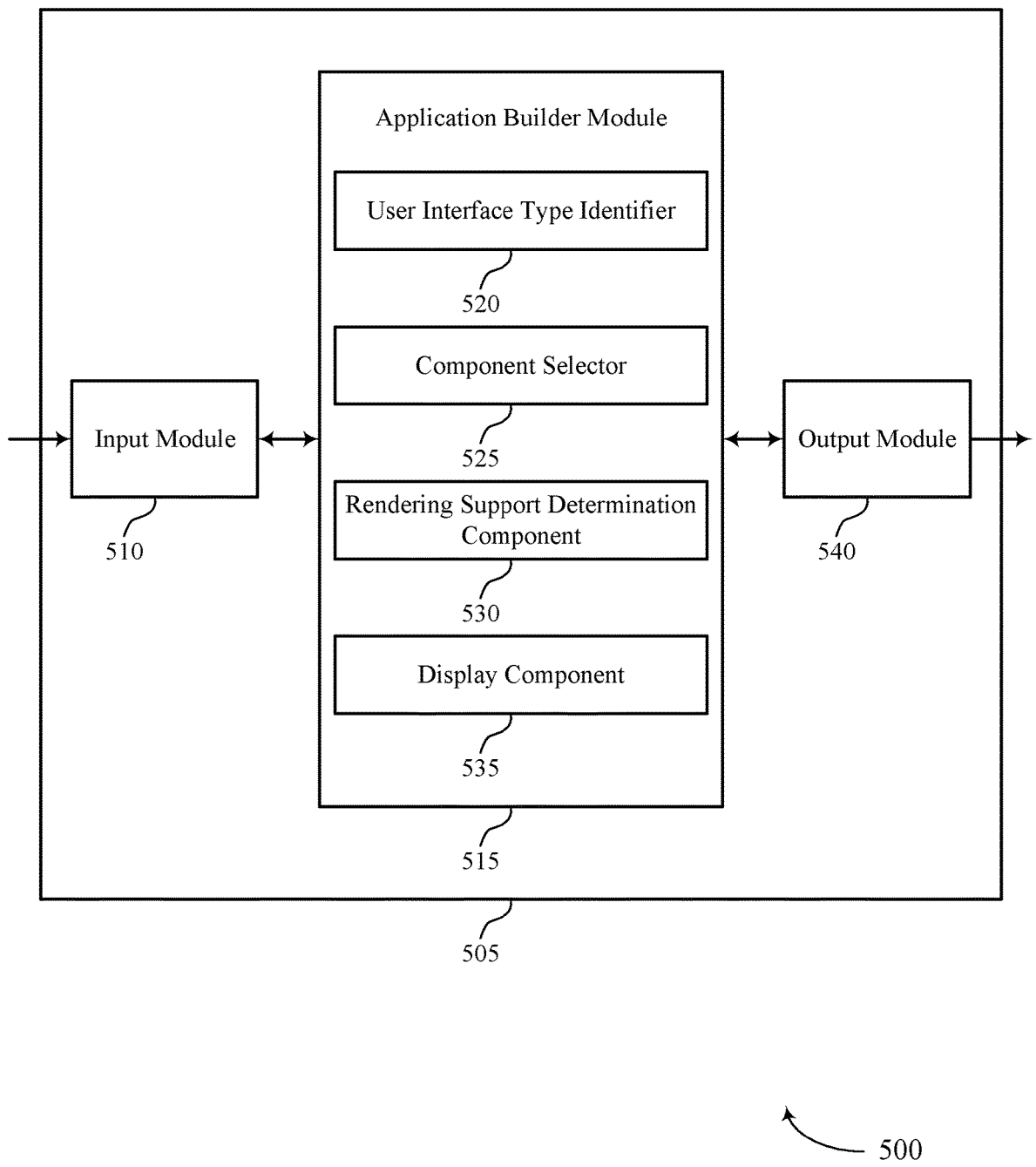
FIG. 5 shows a block diagram of an apparatus that supports configuring components in a display template based on a user interface type in accordance with aspects of the present disclosure.

FIG. 5 shows a block diagram 500 of an apparatus 505 that supports configuring components in a display template based on a user interface type in accordance with aspects of the present disclosure. The apparatus 505 may include an input module 510, an application builder module 515, and an output module 540. The apparatus 505 may also include a processor. Each of these components may be in communication with one another (e.g., via one or more buses). In some cases, the apparatus 505 may be an example of a user terminal, a database server, or a system containing multiple computing devices.

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the application builder module 515 to support configuring components in a display template based on a user interface type. In some cases, the input module 510 may be a component of an input/output (I/O) controller 715 as described with reference to FIG. 7.

The application builder module 515 may include a user interface type identifier 520, a component selector 525, a rendering support determination component 530, and a display component 535. The application builder module 515 may be an example of aspects of the application builder module 605 or 710 described with reference to FIGS. 6 and 7.

The application builder module 515 and/or at least some of its various sub-components may be implemented in hardware, software executed by a processor, firmware, or any combination thereof. If implemented in software executed by a processor, the functions of the application builder module 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The application builder module 515 and/or at least some of its various sub-components may be physically located at various positions, including being distributed such that portions of functions are implemented at different physical locations by one or more physical devices. In some examples, the application builder module 515 and/or at least some of its various sub-components may be a separate and distinct component in accordance with various aspects of the present disclosure. In other examples, the application builder module 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The user interface type identifier 520 may identify, at a template customization application, a user interface type from a set of user interface types for a display template.

The component selector 525 may receive a user input indicating a component to add to the display template, where the component is selected from a set of components defined in the template customization application. Each component of the set of components may correspond to a single respective metadata file defining the component for all user interface types, of the set of user interface types, that are supported by the component, where at least one component of the set of components corresponds to a single respective metadata file defining the component for two or more user interface types.

The rendering support determination component 530 may determine whether the component supports rendering in the identified user interface type (e.g., based on the underlying metadata file). The display component 535 may display the component in the display template based on the determination.

The output module 540 may manage output signals for the apparatus 505. For example, the output module 540 may receive signals from other components of the apparatus 505, such as the application builder module 515, and may transmit these signals to other components or devices. In some specific examples, the output module 540 may transmit output signals for display in a user interface, for storage in a database or data store, for further processing at a server or server cluster, or for any other processes at any number of devices or systems. In some cases, the output module 540 may be a component of an I/O controller 715 as described with reference to FIG. 7.

Figure 6:
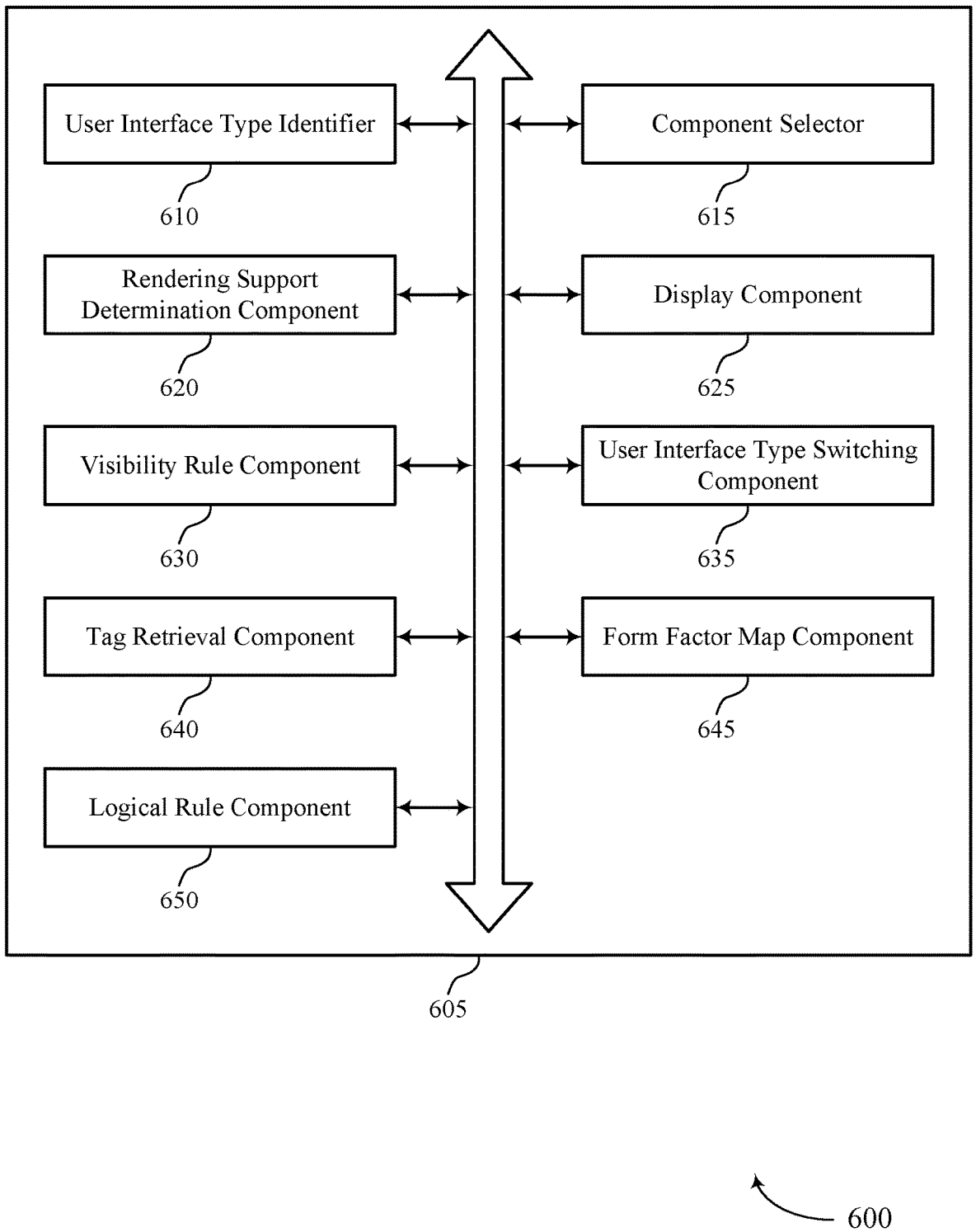
FIG. 6 shows a block diagram of an application builder module that supports configuring components in a display template based on a user interface type in accordance with aspects of the present disclosure.

FIG. 6 shows a block diagram 600 of an application builder module 605 that supports configuring components in a display template based on a user interface type in accordance with aspects of the present disclosure. The application builder module 605 may be an example of aspects of an application builder module 515 or an application builder module 710 described herein. The application builder module 605 may include a user interface type identifier 610, a component selector 615, a rendering support determination component 620, a display component 625, a visibility rule component 630, a user interface type switching component 635, a tag retrieval component 640, a form factor map component 645, and a logical rule component 650. Each of these modules may communicate, directly or indirectly, with one another (e.g., via one or more buses).

The user interface type identifier 610 may identify, at a template customization application, a user interface type from a set of user interface types for a display template. In some cases, the display template may include a single underlying metadata file corresponding to all user interface types of the set of user interface types. In some cases, the user interface type may be an example of a form factor type (e.g., small or large), a device type (e.g., mobile phone, tablet, laptop, desktop, etc.), or a combination thereof. The display template may support the set of user interface types based on a user configuration. In some cases, the display template includes information associated with a data record stored in a database system, a homepage for a third-party application, a set of supported global actions, a user-specific homepage, an email application pane, or a combination thereof.

The component selector 615 may receive a user input indicating a component to add to the display template, where the component is selected from a set of components defined in the template customization application. Each component of the set of components corresponds to a single respective metadata file defining the component for all user interface types, of the set of user interface types, that are supported by the component, where at least one component of the set of components corresponds to a single respective metadata file defining that component for two or more user interface types. In some cases, the user input indicating the component to add to the display template involves the user selecting the component from a displayed list including the set of components defined in the template customization application and performing a drag and drop operation to position the component within the display template.

The rendering support determination component 620 may determine whether the component supports rendering in the identified user interface type. The display component 625 may display the component in the display template based on the determination. In some examples, the display component 625 may determine a display variant for the component corresponding to the identified user interface type, where the component is displayed in the display template according to the display variant.

In some cases, determining whether the component supports rendering in the identified user interface type involves determining that the component supports rendering in the identified user interface type. In these cases, displaying the component in the display template based on the determination may involve displaying a functional version of the component in the display template. In other cases, determining whether the component supports rendering in the identified user interface type involves determining that the component does not support rendering in the identified user interface type. In these cases, displaying the component in the display template based on the determination may involve displaying a placeholder version of the component in the display template, where the placeholder version of the component indicates that rendering for the identified user interface type of the display template is not supported.

The visibility rule component 630 may receive an additional user input indicating a visibility rule for the component, where displaying the component in the display template is further based on the visibility rule. In some cases, the component may support rendering in the identified user interface type, but the visibility rule indicates to not render the component in the identified user interface type. In these cases, the component may be displayed as a placeholder version of the component in the display template based on the visibility rule.

The user interface type switching component 635 may switch from the identified user interface type for the display template to a second user interface type of the set of user interface types for the display template. The rendering support determination component 620 may determine whether each component displayed in the display template supports rendering in the second user interface type.

In some examples, the display component 625 may modify display of at least one component displayed in the display template based on determining whether each component displayed in the display template supports rendering in the second user interface type. In some examples, the display component 625 may change the at least one component displayed in the display template from a placeholder version of the component to a functional version of the component based on the component not supporting rendering in the identified user interface type but supporting rendering in the second user interface type. In other examples, the display component 625 may change the at least one component displayed in the display template from the functional version of the component to the placeholder version of the component based on the component supporting rendering in the identified user interface type but not supporting rendering in the second user interface type. In yet other examples, the display component 625 may adaptively change the at least one component displayed in the display template from a first display variant corresponding to the identified user interface type to a second display variant corresponding to the second user interface type.

The tag retrieval component 640 may retrieve a tag value from the single metadata file defining the component for all user interface types, of the set of user interface types, that are supported by the component, where the tag value indicates which user interface types the component supports rendering in. In some cases, the tag value, the single metadata file, or both are editable by a developer.

The form factor map component 645 may store a form factor map in memory, the form factor map including associations between page types and supported user interface types. In some examples, the form factor map component 645 may determine a set of supported user interface types (e.g., for a page) based on a page type for customization in the template customization application and the form factor map.

The logical rule component 650 may receive an additional user input indicating a logical rule for the component, where displaying the component in the display template is further based on the logical rule and one or more variable inputs to the logical rule. In some cases, the one or more variable inputs to the logical rule may include a user identifier for a user accessing an application that utilizes the display template, a role for the user accessing the application, a data value associated with the application, a current user interface type running the application, a permission set associated with the application, or a combination thereof.

Figure 7:
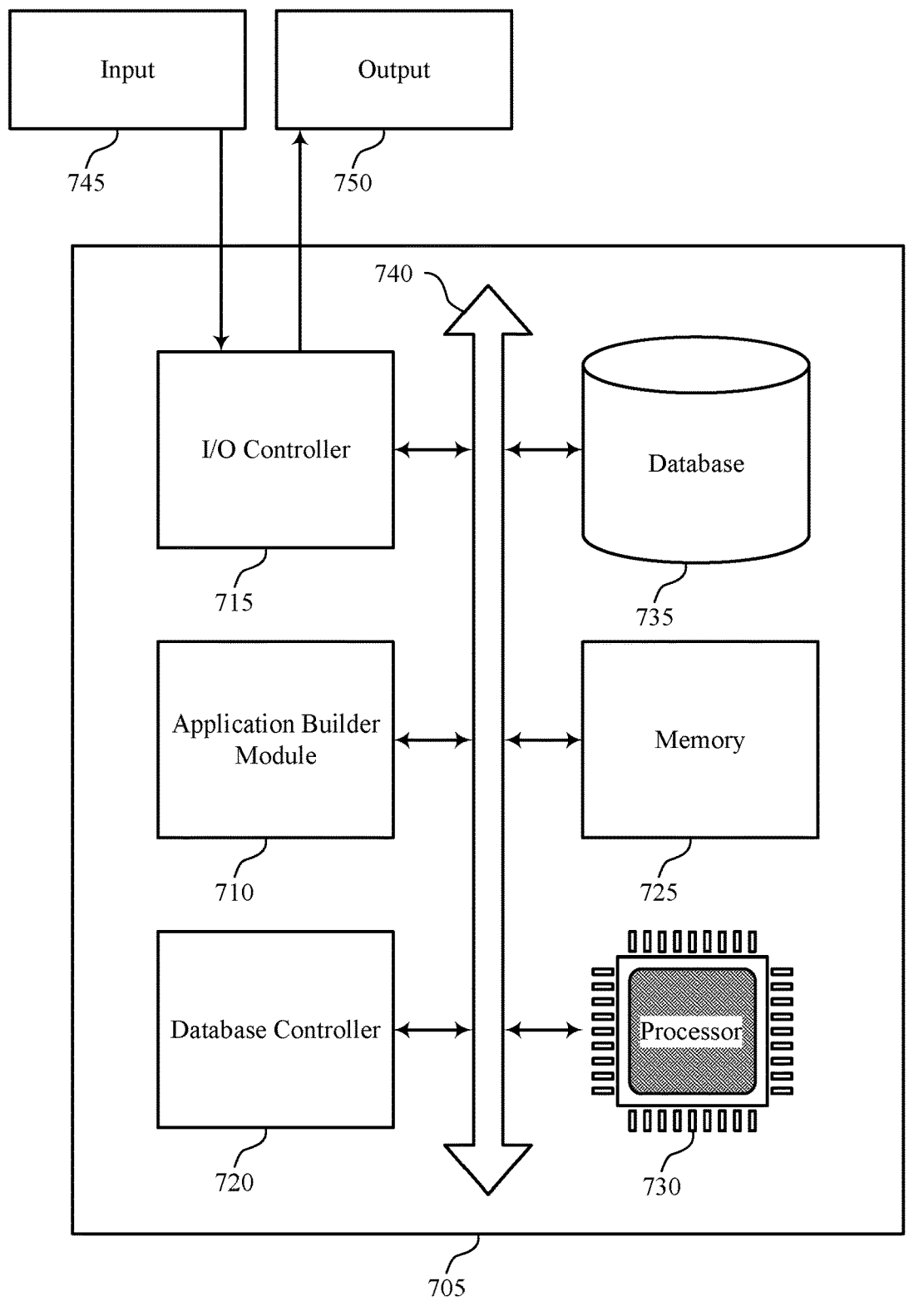
FIG. 7 shows a diagram of a system including a device that supports configuring components in a display template based on a user interface type in accordance with aspects of the present disclosure.

FIG. 7 shows a diagram of a system 700 including a device 705 that supports configuring components in a display template based on a user interface type in accordance with aspects of the present disclosure. The device 705 may be an example of or include the components of a user device or an apparatus 505 as described herein. The device 705 may include components for bi-directional data communications including components for transmitting and receiving communications, including an application builder module 710, an I/O controller 715, a database controller 720, memory 725, a processor 730, and a database 735. These components may be in electronic communication via one or more buses (e.g., bus 740).

The application builder module 710 may be an example of an application builder module 515 or 605 as described herein. For example, the application builder module 710 may perform any of the methods or processes described above with reference to FIGS. 5 and 6. In some cases, the application builder module 710 may be implemented in hardware, software executed by a processor, firmware, or any combination thereof.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting configuring components in a display template based on a user interface type).

Figure 8:
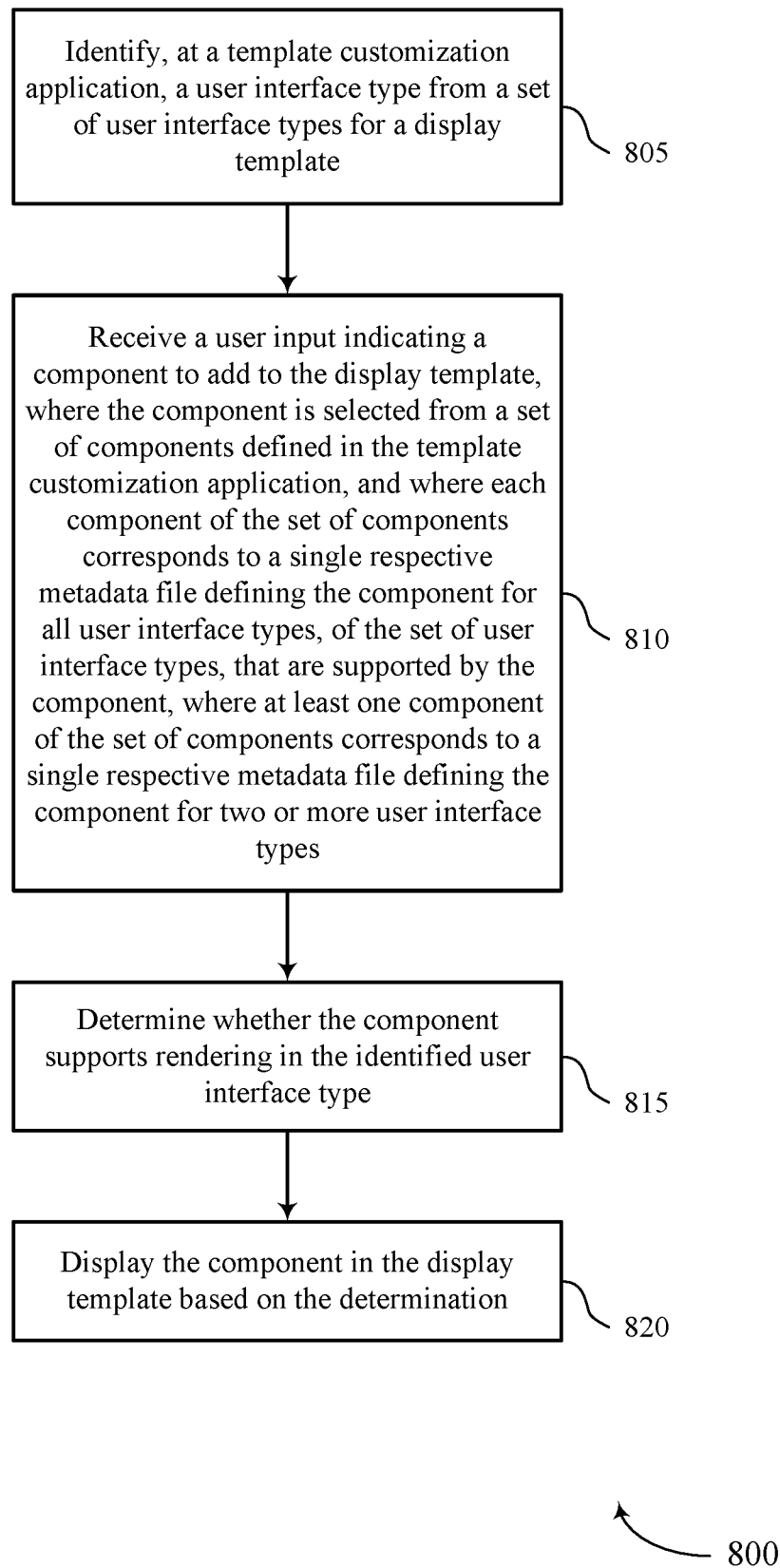
FIGS. 8 through 11 show flowcharts illustrating methods that support configuring components in a display template based on a user interface type in accordance with aspects of the present disclosure.

FIG. 8 shows a flowchart illustrating a method 800 that supports configuring components in a display template based on a user interface type in accordance with aspects of the present disclosure. The operations of method 800 may be implemented by a user device or its components as described herein. For example, the operations of method 800 may be performed by an application builder module as described with reference to FIGS. 5 through 7. In some examples, a user device may execute a set of instructions to control the functional elements of the user device to perform the functions described below. Additionally or alternatively, a user device may perform aspects of the functions described below using special-purpose hardware.

At 805, the user device may identify, at a template customization application, a user interface type from a set of user interface types for a display template. The operations of 805 may be performed according to the methods described herein. In some examples, aspects of the operations of 805 may be performed by a user interface type identifier as described with reference to FIGS. 5 through 7.

At 810, the user device may receive a user input indicating a component to add to the display template. The component may be selected from a set of components defined in the template customization application, where each component of the set of components corresponds to a single respective metadata file defining the component for all user interface types, of the set of user interface types, that are supported by the component. In some cases, at least one component of the set of components corresponds to a single respective metadata file defining that component for two or more user interface types. The operations of 810 may be performed according to the methods described herein. In some examples, aspects of the operations of 810 may be performed by a component selector as described with reference to FIGS. 5 through 7.

At 815, the user device may determine whether the component supports rendering in the identified user interface type. The operations of 815 may be performed according to the methods described herein. In some examples, aspects of the operations of 815 may be performed by a rendering support determination component as described with reference to FIGS. 5 through 7.

At 820, the user device may display the component in the display template based on the determination. The operations of 820 may be performed according to the methods described herein. In some examples, aspects of the operations of 820 may be performed by a display component as described with reference to FIGS. 5 through 7.

Figure 9:
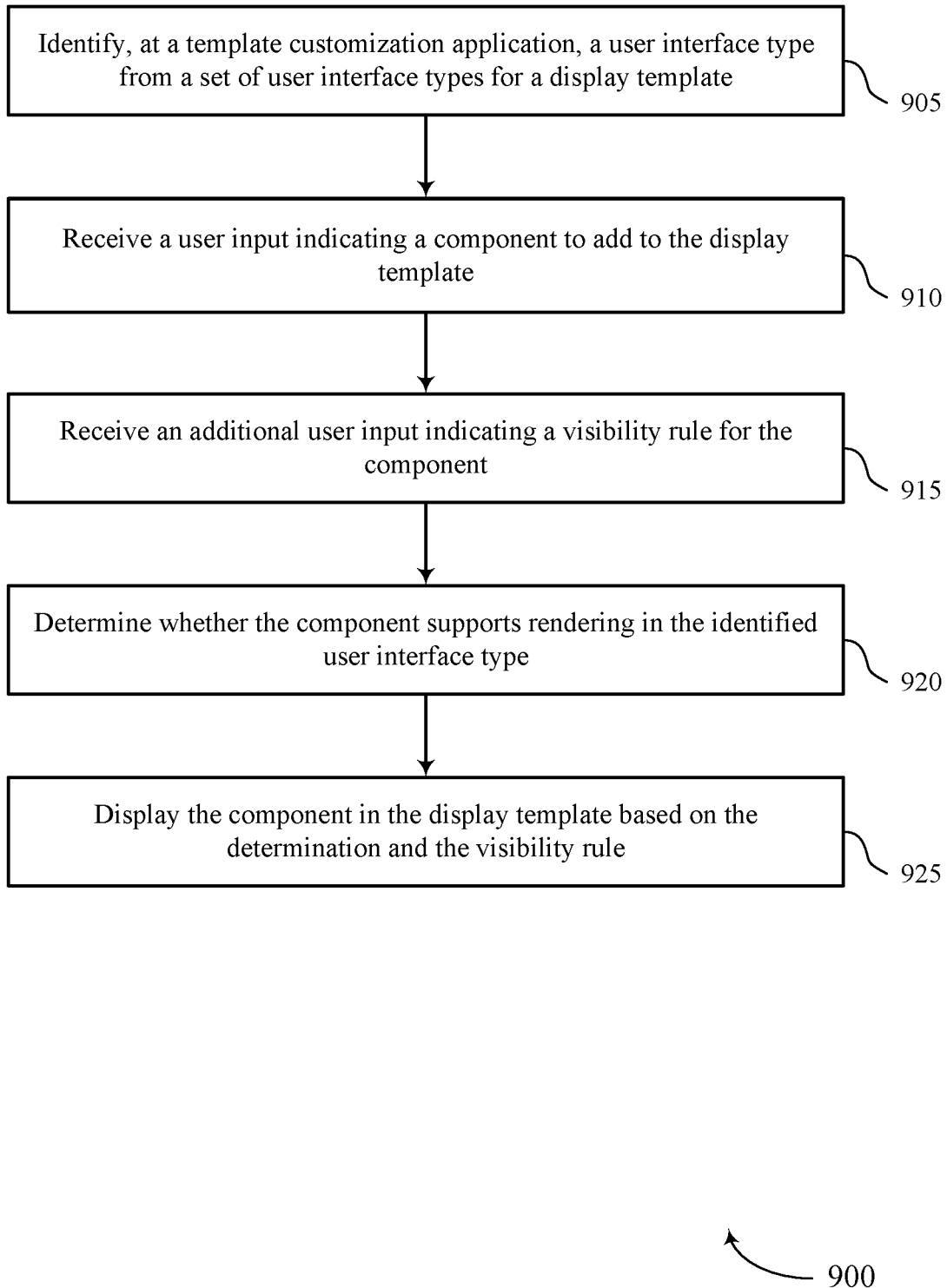

FIG. 9 shows a flowchart illustrating a method 900 that supports configuring components in a display template based on a user interface type in accordance with aspects of the present disclosure. The operations of method 900 may be implemented by a user device or its components as described herein. For example, the operations of method 900 may be performed by an application builder module as described with reference to FIGS. 5 through 7. In some examples, a user device may execute a set of instructions to control the functional elements of the user device to perform the functions described below. Additionally or alternatively, a user device may perform aspects of the functions described below using special-purpose hardware.

At 905, the user device may identify, at a template customization application, a user interface type from a set of user interface types for a display template. The operations of 905 may be performed according to the methods described herein. In some examples, aspects of the operations of 905 may be performed by a user interface type identifier as described with reference to FIGS. 5 through 7.

At 910, the user device may receive a user input indicating a component to add to the display template, where the component is selected from a set of components defined in the template customization application. Each component of the set of components may correspond to a single respective metadata file defining the component for all user interface types, of the set of user interface types, that are supported by the component, where at least one component of the set of components corresponds to a single respective metadata file defining that component for two or more user interface types. The operations of 910 may be performed according to the methods described herein. In some examples, aspects of the operations of 910 may be performed by a component selector as described with reference to FIGS. 5 through 7.

At 915, the user device may receive an additional user input indicating a visibility rule for the component. The operations of 915 may be performed according to the methods described herein. In some examples, aspects of the operations of 915 may be performed by a visibility rule component as described with reference to FIGS. 5 through 7.

At 920, the user device may determine whether the component supports rendering in the identified user interface type (e.g., based on the single metadata file for the component). The operations of 920 may be performed according to the methods described herein. In some examples, aspects of the operations of 920 may be performed by a rendering support determination component as described with reference to FIGS. 5 through 7.

At 925, the user device may display the component in the display template based on the determination and the visibility rule. The operations of 925 may be performed according to the methods described herein. In some examples, aspects of the operations of 925 may be performed by a display component as described with reference to FIGS. 5 through 7.

Figure 10:
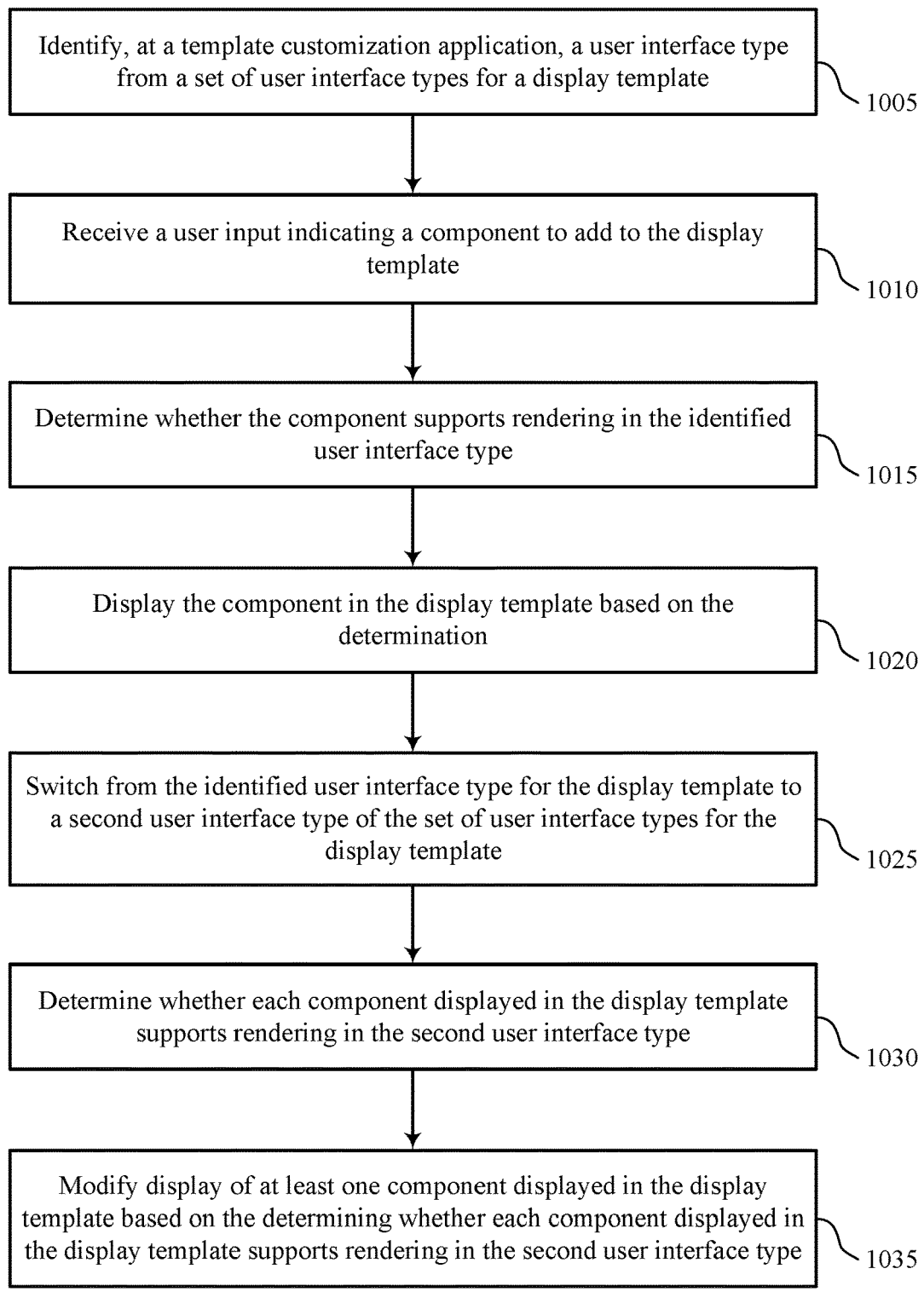

FIG. 10 shows a flowchart illustrating a method 1000 that supports configuring components in a display template based on a user interface type in accordance with aspects of the present disclosure. The operations of method 1000 may be implemented by a user device or its components as described herein. For example, the operations of method 1000 may be performed by an application builder module as described with reference to FIGS. 5 through 7. In some examples, a user device may execute a set of instructions to control the functional elements of the user device to perform the functions described below. Additionally or alternatively, a user device may perform aspects of the functions described below using special-purpose hardware.

At 1005, the user device may identify, at a template customization application, a user interface type from a set of user interface types for a display template. The operations of 1005 may be performed according to the methods described herein. In some examples, aspects of the operations of 1005 may be performed by a user interface type identifier as described with reference to FIGS. 5 through 7.

At 1010, the user device may receive a user input indicating a component to add to the display template, where the component is selected from a set of components defined in the template customization application. Each component of the set of components may correspond to a single respective metadata file defining the component for all user interface types, of the set of user interface types, that are supported by the component, where at least one component of the set of components corresponds to a single respective metadata file defining that component for two or more user interface types. The operations of 1010 may be performed according to the methods described herein. In some examples, aspects of the operations of 1010 may be performed by a component selector as described with reference to FIGS. 5 through 7.

At 1015, the user device may determine whether the component supports rendering in the identified user interface type. The operations of 1015 may be performed according to the methods described herein. In some examples, aspects of the operations of 1015 may be performed by a rendering support determination component as described with reference to FIGS. 5 through 7.

At 1020, the user device may display the component in the display template based on the determination. The operations of 1020 may be performed according to the methods described herein. In some examples, aspects of the operations of 1020 may be performed by a display component as described with reference to FIGS. 5 through 7.

At 1025, the user device may switch from the identified user interface type for the display template to a second user interface type of the set of user interface types for the display template. The operations of 1025 may be performed according to the methods described herein. In some examples, aspects of the operations of 1025 may be performed by a user interface type switching component as described with reference to FIGS. 5 through 7.

At 1030, the user device may determine whether each component displayed in the display template supports rendering in the second user interface type. The operations of 1030 may be performed according to the methods described herein. In some examples, aspects of the operations of 1030 may be performed by a rendering support determination component as described with reference to FIGS. 5 through 7.

At 1035, the user device may modify display of at least one component displayed in the display template based on determining whether each component displayed in the display template supports rendering in the second user interface type. The operations of 1035 may be performed according to the methods described herein. In some examples, aspects of the operations of 1035 may be performed by a display component as described with reference to FIGS. 5 through 7.

Figure 11:
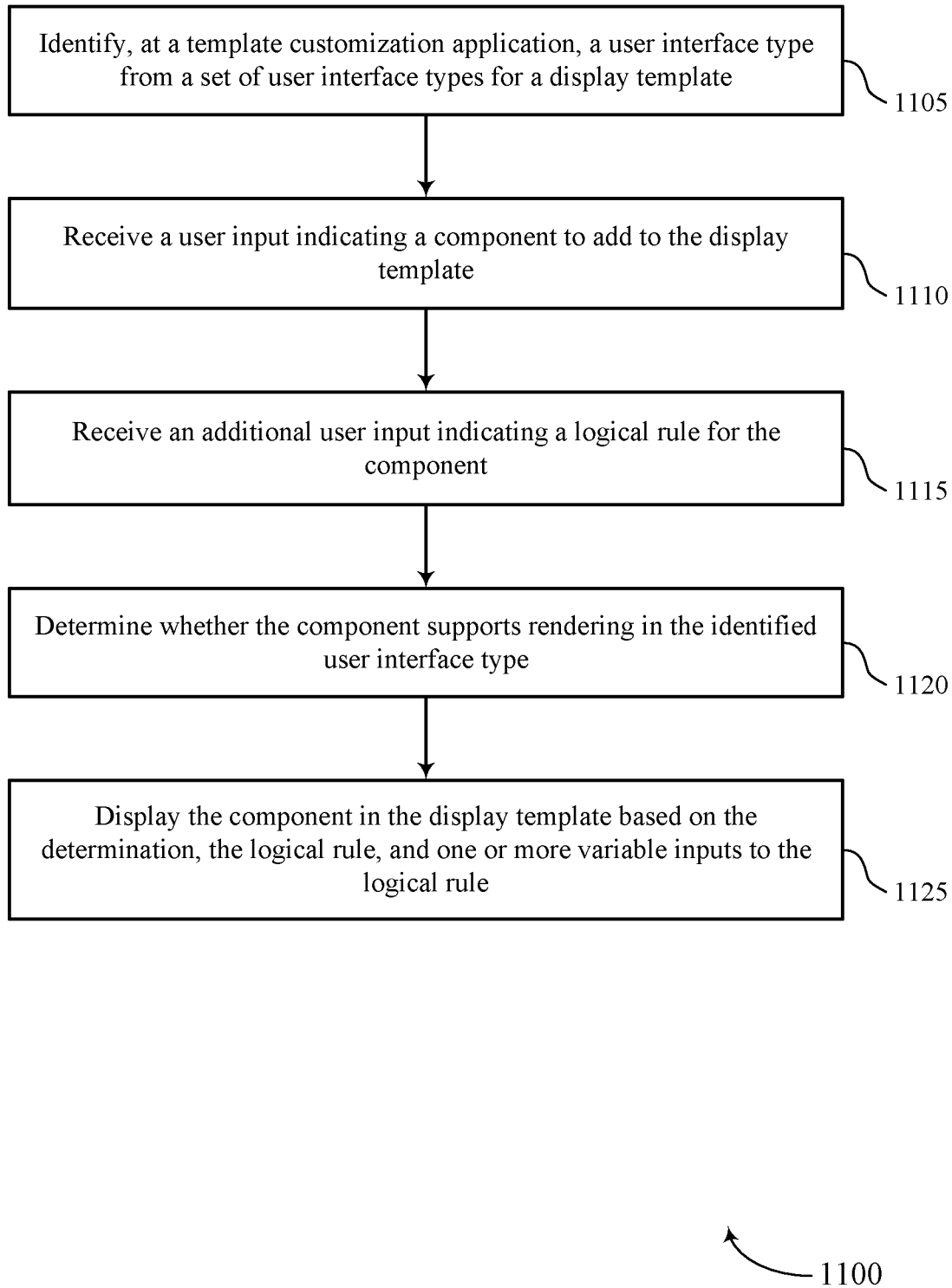

FIG. 11 shows a flowchart illustrating a method 1100 that supports configuring components in a display template based on a user interface type in accordance with aspects of the present disclosure. The operations of method 1100 may be implemented by a user device or its components as described herein. For example, the operations of method 1100 may be performed by an application builder module as described with reference to FIGS. 5 through 7. In some examples, a user device may execute a set of instructions to control the functional elements of the user device to perform the functions described below. Additionally or alternatively, a user device may perform aspects of the functions described below using special-purpose hardware.

At 1105, the user device may identify, at a template customization application, a user interface type from a set of user interface types for a display template. The operations of 1105 may be performed according to the methods described herein. In some examples, aspects of the operations of 1105 may be performed by a user interface type identifier as described with reference to FIGS. 5 through 7.

At 1110, the user device may receive a user input indicating a component to add to the display template, where the component is selected from a set of components defined in the template customization application. Each component of the set of components may correspond to a single respective metadata file defining the component for all user interface types, of the set of user interface types, that are supported by the component, where at least one component of the set of components corresponds to a single respective metadata file defining that component for two or more user interface types. The operations of 1110 may be performed according to the methods described herein. In some examples, aspects of the operations of 1110 may be performed by a component selector as described with reference to FIGS. 5 through 7.

At 1115, the user device may receive an additional user input indicating a logical rule for the component. The operations of 1115 may be performed according to the methods described herein. In some examples, aspects of the operations of 1115 may be performed by a logical rule component as described with reference to FIGS. 5 through 7.

At 1120, the user device may determine whether the component supports rendering in the identified user interface type. The operations of 1120 may be performed according to the methods described herein. In some examples, aspects of the operations of 1120 may be performed by a rendering support determination component as described with reference to FIGS. 5 through 7.

At 1125, the user device may display the component in the display template based on the determination. Additionally, the user device may base the display of the component on the logical rule and one or more variable inputs to the logical rule. The operations of 1125 may be performed according to the methods described herein. In some examples, aspects of the operations of 1125 may be performed by a display component as described with reference to FIGS. 5 through 7.

A method for configuring components of a user interface is described. The method may include identifying, at a template customization application, a user interface type from a set of user interface types for a display template and receiving a user input indicating a component to add to the display template, where the component is selected from a set of components defined in the template customization application. Each component of the set of components may correspond to a single respective metadata file defining the component for all user interface types, of the set of user interface types, that are supported by the component, where at least one component of the set of components corresponds to a single respective metadata file defining the at least one component for two or more user interface types. The method may further include determining whether the component supports rendering in the identified user interface type and displaying the component in the display template based on the determination.

An apparatus for configuring components of a user interface is described. The apparatus may include a processor, memory in electronic communication with the processor, and instructions stored in the memory. The instructions may be executable by the processor to cause the apparatus to identify, at a template customization application, a user interface type from a set of user interface types for a display template and receive a user input indicating a component to add to the display template, where the component is selected from a set of components defined in the template customization application. Each component of the set of components may correspond to a single respective metadata file defining the component for all user interface types, of the set of user interface types, that are supported by the component, where at least one component of the set of components corresponds to a single respective metadata file defining the at least one component for two or more user interface types. The instructions may be further executable by the processor to cause the apparatus to determine whether the component supports rendering in the identified user interface type and display the component in the display template based on the determination.

Another apparatus for configuring components of a user interface is described. The apparatus may include means for identifying, at a template customization application, a user interface type from a set of user interface types for a display template and means for receiving a user input indicating a component to add to the display template, where the component is selected from a set of components defined in the template customization application. Each component of the set of components may correspond to a single respective metadata file defining the component for all user interface types, of the set of user interface types, that are supported by the component, where at least one component of the set of components corresponds to a single respective metadata file defining the at least one component for two or more user interface types. The apparatus may further include means for determining whether the component supports rendering in the identified user interface type and means for displaying the component in the display template based on the determination.

A non-transitory computer-readable medium storing code for configuring components of a user interface is described. The code may include instructions executable by a processor to identify, at a template customization application, a user interface type from a set of user interface types for a display template and receive a user input indicating a component to add to the display template, where the component is selected from a set of components defined in the template customization application. Each component of the set of components may correspond to a single respective metadata file defining the component for all user interface types, of the set of user interface types, that are supported by the component, where at least one component of the set of components corresponds to a single respective metadata file defining the at least one component for two or more user interface types. The code may further include instructions executable by the processor to determine whether the component supports rendering in the identified user interface type and display the component in the display template based on the determination.

Some examples of the method, apparatuses, and non-transitory computer-readable medium described herein may further include operations, features, means, or instructions for receiving an additional user input indicating a visibility rule for the component, where displaying the component in the display template may be further based on the visibility rule.

In some examples of the method, apparatuses, and non-transitory computer-readable medium described herein, the component supports rendering in the identified user interface type, but the visibility rule indicates to not render the component in the identified user interface type. In these examples of the method, apparatuses, and non-transitory computer-readable medium described herein, the component may be displayed as a placeholder version of the component in the display template based on the visibility rule.

In some examples of the method, apparatuses, and non-transitory computer-readable medium described herein, determining whether the component supports rendering in the identified user interface type includes determining that the component supports rendering in the identified user interface type, and displaying the component in the display template based on the determination includes displaying a functional version of the component in the display template. In other examples of the method, apparatuses, and non-transitory computer-readable medium described herein, determining whether the component supports rendering in the identified user interface type includes determining that the component does not support rendering in the identified user interface type, and displaying the component in the display template based on the determination includes displaying a placeholder version of the component in the display template, where the placeholder version of the component indicates that rendering for the identified user interface type of the display template may be not supported.

Some examples of the method, apparatuses, and non-transitory computer-readable medium described herein may further include operations, features, means, or instructions for switching from the identified user interface type for the display template to a second user interface type of the set of user interface types for the display template, determining whether each component displayed in the display template supports rendering in the second user interface type, and modifying display of at least one component displayed in the display template based on the determining whether each component displayed in the display template supports rendering in the second user interface type.

In some examples of the method, apparatuses, and non-transitory computer-readable medium described herein, modifying the display of the at least one component displayed in the display template may include operations, features, means, or instructions for changing the at least one component displayed in the display template from a placeholder version of the at least one component displayed in the display template to a functional version of the at least one component displayed in the display template based on the at least one component displayed in the display template not supporting rendering in the identified user interface type but supporting rendering in the second user interface type. In other examples of the method, apparatuses, and non-transitory computer-readable medium described herein, modifying the display of the at least one component displayed in the display template may include operations, features, means, or instructions for changing the at least one component displayed in the display template from the functional version of the at least one component displayed in the display template to the placeholder version of the at least one component displayed in the display template based on the at least one component displayed in the display template supporting rendering in the identified user interface type but not supporting rendering in the second user interface type. In yet other examples of the method, apparatuses, and non-transitory computer-readable medium described herein, modifying the display of the at least one component displayed in the display template may include operations, features, means, or instructions for adaptively changing the at least one component displayed in the display template from a first display variant corresponding to the identified user interface type to a second display variant corresponding to the second user interface type.

In some examples of the method, apparatuses, and non-transitory computer-readable medium described herein, the display template includes a single underlying metadata file corresponding to all user interface types of the set of user interface types.

In some examples of the method, apparatuses, and non-transitory computer-readable medium described herein, determining whether the component supports rendering in the identified user interface type may include operations, features, means, or instructions for retrieving a tag value from a single metadata file defining the component for all user interface types, of the set of user interface types, that are supported by the component, where the tag value indicates which user interface types the component supports rendering in. In some examples of the method, apparatuses, and non-transitory computer-readable medium described herein, the tag value, the single metadata file, or both may be editable by a developer.

Some examples of the method, apparatuses, and non-transitory computer-readable medium described herein may further include operations, features, means, or instructions for storing a form factor map in memory, the form factor map including associations between page types and supported user interface types and determining a set of supported user interface types based on a page type for customization in the template customization application and the form factor map.

In some examples of the method, apparatuses, and non-transitory computer-readable medium described herein, determining whether the component supports rendering in the identified user interface type may include operations, features, means, or instructions for determining a display variant for the component corresponding to the identified user interface type, where the component may be displayed in the display template according to the display variant.

Some examples of the method, apparatuses, and non-transitory computer-readable medium described herein may further include operations, features, means, or instructions for receiving an additional user input indicating a logical rule for the component, where displaying the component in the display template may be further based on the logical rule and one or more variable inputs to the logical rule. In some examples of the method, apparatuses, and non-transitory computer-readable medium described herein, the one or more variable inputs to the logical rule may include a user identifier for a user accessing an application that utilizes the display template, a role for the user accessing the application that utilizes the display template, a data value associated with the application that utilizes the display template, a current user interface type running the application that utilizes the display template, a permission set associated with the application that utilizes the display template, or a combination thereof.

In some examples of the method, apparatuses, and non-transitory computer-readable medium described herein, the user interface type includes a form factor type, a device type, or a combination thereof. In some examples of the method, apparatuses, and non-transitory computer-readable medium described herein, the display template supports the set of user interface types based on a user configuration.

In some examples of the method, apparatuses, and non-transitory computer-readable medium described herein, the user input indicating the component to add to the display template includes the user selecting the component from a displayed list including the set of components defined in the template customization application and performing a drag and drop operation to position the component within the display template.

In some examples of the method, apparatuses, and non-transitory computer-readable medium described herein, the display template includes information associated with a data record stored in a database system, a homepage for a third-party application, a set of supported global actions, a user-specific homepage, an email application pane, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for running a template customization application at a processing device, comprising:
storing one or more metadata files defining one or more respective components, wherein a metadata file of the one or more metadata files defines, for a plurality of user interface types, a display parameter, a functional parameter, or both for a component of the one or more respective components;
storing an additional metadata file corresponding to a display template for the template customization application, the additional metadata file comprising references to a set of components;
receiving a request to run the template customization application at a user device;
sending, for display at the user device and in response to the request, the display template defined by the additional metadata file, wherein the display template is configured to display at least a functional version of a first component based at least in part on the display template supporting the first component in a first user interface type and a placeholder version of a second component based at least in part on the display template failing to support the second component in the first user interface type according to the referenced set of components;
modifying a respective metadata file defining the second component to add rendering support for the second component in the first user interface type; and
updating the display template based at least in part on the modifying, the updated display template configured to display a functional version of the second component based at least in part on the rendering support added to the respective metadata file defining the second component.

2. The method of claim 1, further comprising:
receiving an indication of a user operating the user device selecting a third component to add to the display template; and
modifying the additional metadata file corresponding to the display template to add an additional reference to the third component based at least in part on the indication of the user selecting the third component to add to the display template.

3. The method of claim 1, further comprising:
receiving a user input defining the rendering support for the second component in the first user interface type, wherein the modifying the respective metadata file defining the second component is based at least in part on the user input.

4. The method of claim 1, further comprising:
receiving a user input indicating one or more visibility rules for the display template, wherein a visibility rule of the one or more visibility rules defines a visibility of a respective component of the one or more respective components in a user interface type of the plurality of user interface types.

5. The method of claim 4, further comprising:
determining that an additional respective metadata file defining a third component indicates to render the third component in the first user interface type; and
determining that a first visibility rule of the one or more visibility rules indicates to refrain from rendering the third component in the first user interface type, wherein the display template is configured to display a placeholder version of the third component based at least in part on the first visibility rule.

6. The method of claim 1, further comprising:
reading a tag value from a first respective metadata file defining the first component, wherein the tag value indicates in which user interface types of the plurality of user interface types the first component supports rendering; and
determining that the first component supports rendering in the first user interface type based at least in part on the tag value, wherein the display template is configured to display the functional version of the first component based at least in part on the determining.

7. The method of claim 6, wherein the tag value, the respective metadata file defining the first component, or both are editable by a developer.

8. The method of claim 1, further comprising:
receiving a user input indicating a logical rule for a third component, wherein the display template is configured to display a functional version of the third component, a placeholder version of the third component, a display variant of the third component, or a combination thereof based at least in part on the logical rule and one or more variable inputs to the logical rule.

9. The method of claim 8, wherein the one or more variable inputs to the logical rule comprise a user identifier for a user accessing an application that utilizes the display template, a role for the user accessing the application that utilizes the display template, a data value associated with the application that utilizes the display template, a current user interface type running the application that utilizes the display template, a permission set associated with the application that utilizes the display template, or a combination thereof.

10. The method of claim 1, further comprising:
receiving an indication of a user operating the user device selecting the first user interface type from a list comprising the plurality of user interface types displayed by the template customization application, wherein the display template is sent for display at the user device based at least in part on receiving the indication of the user selecting the first user interface type.

11. The method of claim 1, wherein the display template comprises information associated with a data record stored in a database system, a homepage for a third-party application, a set of supported global actions, a user-specific homepage, an email application pane, or a combination thereof.

12. A method for running a template customization application at a processing device, comprising:
sending, for display in a user interface of a user device, a display template corresponding to a first user interface type of a plurality of user interface types supported by the display template, the display template comprising at least a first version of a component defined by a single metadata file for the first user interface type, wherein the single metadata file defines a plurality of versions of the component for the plurality of user interface types supported by the display template comprising at least a first display variant and a second display variant;
receiving a user input indicating a selection of a second user interface type of the plurality of user interface types supported by the display template;
switching, in the display template, from the first version of the component to a second version of the component in response to the user input, wherein the single metadata file additionally defines the second version of the component for the second user interface type, and wherein the switching comprises modifying the display template from being configured to display the first display variant of the component to being configured to display the second display variant of the component; and
sending, for display in the user interface of the user device, the display template corresponding to the second user interface type based at least in part on the switching.

13. The method of claim 12, wherein receiving the user input indicating the selection of the second user interface type comprises:
receiving an indication of a user operating the user device selecting the second user interface type from a list comprising the plurality of user interface types displayed by the template customization application at the user device.

14. The method of claim 12, wherein switching from the first version of the component to the second version of the component further comprises:
modifying the display template from being configured to display a placeholder version of a second component to being configured to display a functional version of the second component, wherein a second single metadata file defines the placeholder version and the functional version of the second component; or
modifying the display template from being configured to display the functional version of the second component to being configured to display the placeholder version of the second component, wherein the second single metadata file defines the functional version and the placeholder version of the second component.

15. The method of claim 12, wherein:
the first user interface type corresponds to a first form factor;
the second user interface type corresponds to a second form factor different from the first form factor; and
the user device has a third form factor independent of the first form factor and the second form factor.

16. The method of claim 12, wherein:
the first user interface type corresponds to a first device type;
the second user interface type corresponds to a second device type different from the first device type; and
the user device is of a third device type independent of the first device type and the second device type.

17. An apparatus for running a template customization application at a processing device, comprising:
a processor;
memory in electronic communication with the processor; and
instructions stored in the memory and executable by the processor to cause the apparatus to:
store one or more metadata files defining one or more respective components, wherein a metadata file of the one or more metadata files defines, for a plurality of user interface types, a display parameter, a functional parameter, or both for a component of the one or more respective components;
store an additional metadata file corresponding to a display template for the template customization application, the additional metadata file comprising references to a set of components;
receive a request to run the template customization application at a user device;
send, for display at the user device and in response to the request, the display template defined by the additional metadata file, wherein the display template is configured to display at least a functional version of a first component based at least in part on the display template supporting the first component in a first user interface type and a placeholder version of a second component based at least in part on the display template failing to support the second component in the first user interface type according to the referenced set of components;

modify a respective metadata file defining the second component to add rendering support for the second component in the first user interface type; and update the display template based at least in part on the modifying, the updated display template configured to display a functional version of the second component based at least in part on the rendering support added to the respective metadata file defining the second component.

18. The apparatus of claim 17, wherein the instructions are further executable by the processor to cause the apparatus to:

receive an indication of a user operating the user device selecting a third component to add to the display template; and modify the additional metadata file corresponding to the display template to add an additional reference to the third component based at least in part on the indication of the user selecting the third component to add to the display template.

19. The apparatus of claim 17, wherein the instructions are further executable by the processor to cause the apparatus to:

receive a user input defining the rendering support for the second component in the first user interface type, wherein the modifying the respective metadata file defining the second component is based at least in part on the user input.

20. The apparatus of claim 17, wherein the instructions are further executable by the processor to cause the apparatus to:

receive a user input indicating one or more visibility rules for the display template, wherein a visibility rule of the one or more visibility rules defines a visibility of a respective component of the one or more respective components in a user interface type of the plurality of user interface types.

* * * * *